(12) United States Patent
Matsubara et al.

(10) Patent No.: US 9,203,449 B2
(45) Date of Patent: Dec. 1, 2015

(54) DELAY QUANTITY ESTIMATION APPARATUS AND DELAY QUANTITY ESTIMATION METHOD

(71) Applicant: FUJITSU LIMITED, Kawasaki-shi, Kanagawa (JP)

(72) Inventors: Satoshi Matsubara, Kawasaki (JP); Hideharu Shako, Yokohama (JP); Mitsuharu Hamano, Sendai (JP); Kazuo Nagatani, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/039,598

(22) Filed: Sep. 27, 2013

(65) Prior Publication Data
US 2014/0146910 A1    May 29, 2014

(30) Foreign Application Priority Data

Nov. 29, 2012    (JP) .................................. 2012-261727

(51) Int. Cl.
*H03D 1/00* (2006.01)
*H04B 1/04* (2006.01)

(52) U.S. Cl.
CPC .................................. *H04B 1/0475* (2013.01)

(58) Field of Classification Search
CPC .................................................. H04B 1/0475

USPC ......................................................... 375/343
See application file for complete search history.

(56) References Cited

U.S. PATENT DOCUMENTS

| 5,365,053 A | 11/1994 | Schielke et al. |
| 2003/0021446 A1 | 1/2003 | Dietz et al. |
| 2010/0026354 A1* | 2/2010 | Utsunomiya et al. ......... 327/161 |

FOREIGN PATENT DOCUMENTS

| JP | 06-504419 | 5/1994 |
| JP | 2003157145 | 5/2003 |
| JP | 2010-034863 | 2/2010 |

* cited by examiner

*Primary Examiner* — Tanmay Shah
(74) *Attorney, Agent, or Firm* — Fujitsu Patent Center

(57) ABSTRACT

A delay quantity estimation apparatus comprises a first correlation value arithmetic unit to calculate a first correlation value as a correlation value between a first input signal and a feedback signal delayed with a first delay value; a second correlation value arithmetic unit to calculate a second correlation value as a correlation value between the first input signal and a feedback signal delayed with a second delay value; and a delay quantity estimation unit to estimate a delay quantity of the feedback signal with respect to the input signal on the basis of the first difference value as a difference between the first correlation value and the second correlation value, wherein the second delay value is a value given by adding a certain value to the first delay value.

4 Claims, 27 Drawing Sheets

DELAY QUANTITY ESTIMATION APPARATUS AND DELAY QUANTITY ESTIMATION METHOD

CROSS-REFERENCE TO RELATED APPLICATION

This application is based upon and claims the benefit of priority of the prior Japanese Patent Application No. 2012-261727 filed on Nov. 29, 2012, the entire contents of which are incorporated herein by reference.

FIELD

The present invention relates to a delay quantity estimation apparatus and a delay quantity estimation method.

BACKGROUND

Over the recent years, high-efficiency transmission based on digitalization has been adopted frequently in wireless communications. What is important in the case of applying a multi-valued phase modulation method to the wireless communications is a technology of restraining a nonlinear distortion by linearizing especially an amplifying characteristic of a power amplifier for transmission on a transmission side and reducing adjacent-channel leakage power. Further, a case of contriving to improve power efficiency by use of an amplifier exhibiting inferior linearity involves employing a technology for compensating the nonlinear distortion.

A digital nonlinear distortion compensation method is known as the distortion compensation technology. The digital nonlinear distortion compensation method is a method of feedback-detecting carrier waves obtained by orthogonal modulation using modulation signals, converting the modulation signal (transmission baseband signal) and a feedback signal (feedback baseband signal) into digital signals, then comparing these digital signals, and updating a distortion compensation coefficient on the basis of a result of this comparison.

DOCUMENT OF PRIOR ART

Patent Document

[Patent document 1] Japanese Patent Application Laid-Open Publication No. 2010-34863

SUMMARY

In the digital nonlinear distortion compensation method, the transmission baseband signal (Ref signal) and the feedback baseband signal (FB signal) are converted into the digital signals and then compared with each other, and hence distortion compensation performance declines if a timing of the Ref signal is not matched with a timing of the FB signal. It is therefore requested to measure a delay (delay time, delay value) of the FB signal with respect to the Ref signal with high accuracy. It is a general method that the delay of the FB signal with respect to the Ref signal is corrected on the unit of a FB signal sampling clock (clk) and the unit of a Ref signal sampling clock (clk) and further corrected on the unit of "tap" by which a clock-to-clock interval is divided. A method using a correlation operation is known as the method of measuring the delay of the FB signal with respect to the Ref signal. This method is a method of storing the FB signal and the Ref signal in a memory, delaying the FB signal on the unit of "clk" and the unit of "tap", and setting a "clk" delay and a "tap" delay each exhibiting the highest correlation coefficient between the FB signal and the Ref signal as an optimum delay of the FB signal and an optimum delay of the Ref signal.

FIG. 1 is a diagram illustrating an example of dependency of the correlation value between the Ref signal and the FB signal on the delay of the FB signal with respect to the Ref signal. In the vicinity of a region where the correlation value is maximized, an arithmetic error of the correlation value becomes larger than a change of the correlation value against a change of the delay value, and it may happen that the delay value in the maximum correlation value does not become an optimum delay.

By contrast with this, there is a method of extracting two points distanced by a predetermined quantity or more on positive and negative sides from the delay value with which the maximum correlation value is obtained and with the correlation values being identical, and setting an intermediate point between these two points as the delay value. The correlation value, however, changes based on electric power of the Ref signal, and therefore the correlation value with respect to the delay quantity depicts a different curve depending on a data acquisition timing even with the same signal.

FIG. 2 is a diagram illustrating an example of the dependency of the correlation value between the Ref signal and the FB signal on the delay of the FB signal with respect to the Ref signal at a plurality of data acquisition timings. FIG. 2 illustrates the example of three types of timings (timing A, timing B, timing C).

FIG. 3 is a diagram illustrating an example of how the correlation value changes when not storing the Ref signal and the FB signal in the memory but changing the delay quantity. As in the example of FIG. 3, when not storing the Ref signal and the FB signal in the memory but calculating the correlation value while delaying the FB signal on the unit of "clk" and the unit of "tap" with the Ref signal having a different timing, it may happen that the delay value with the correlation value taking the maximum value does not become the optimum delay.

By contrast with this, there is a method of performing measurements a plural number of times and averaging results of the measurements. This method has, however, such a problem that the measurements being performed the plural number of times entail increasing an arithmetic throughput. Moreover, it is required for calculating the dependency of the correlation value on the delay quantity by use of the signals of the identical timing that the Ref signal and the FB signal are to be stored beforehand in the memory, and hence such a problem arises that a circuit scale is enlarged.

According to a first aspect, a delay quantity estimation apparatus includes:

a first correlation value arithmetic unit to calculate a first correlation value as a correlation value between a first input signal and a feedback signal delayed with a first delay value;

a second correlation value arithmetic unit to calculate a second correlation value as a correlation value between the first input signal and a feedback signal delayed with a second delay value; and a delay quantity estimation unit to estimate a delay quantity of the feedback signal with respect to the input signal on the basis of the first difference value as a difference between the first correlation value and the second correlation value, wherein the second delay value is a value given by adding a certain value to the first delay value.

The aspect of the disclosure may also be realized in such a way that a program is executed by an information processing apparatus. Namely, a configuration of the disclosure can be specified by way of a program for making the information processing apparatus execute processes carried out by respective means in the aspect described above or specified by way of a non-transitory computer readable recording medium recorded with the program. Further, the configuration of the disclosure may also be specified by way of a method by which the information processing apparatus executes the processes carried out by the respective means described above.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An embodiment will hereinafter be described with reference to the drawings. A configuration of the embodiment is an exemplification, and a configuration of the disclosure is not limited to the specific configuration of the embodiment of the disclosure. On the occasion of implementing the configuration of the disclosure, the specific configuration corresponding to the embodiment may properly be adopted.

A signal transmission apparatus described in the embodiment is an example of an embodiment of a delay quantity estimation apparatus. The delay quantity estimation apparatus is not limited to the signal transmission apparatus.

First Embodiment

Example of Configuration

Figure 1:
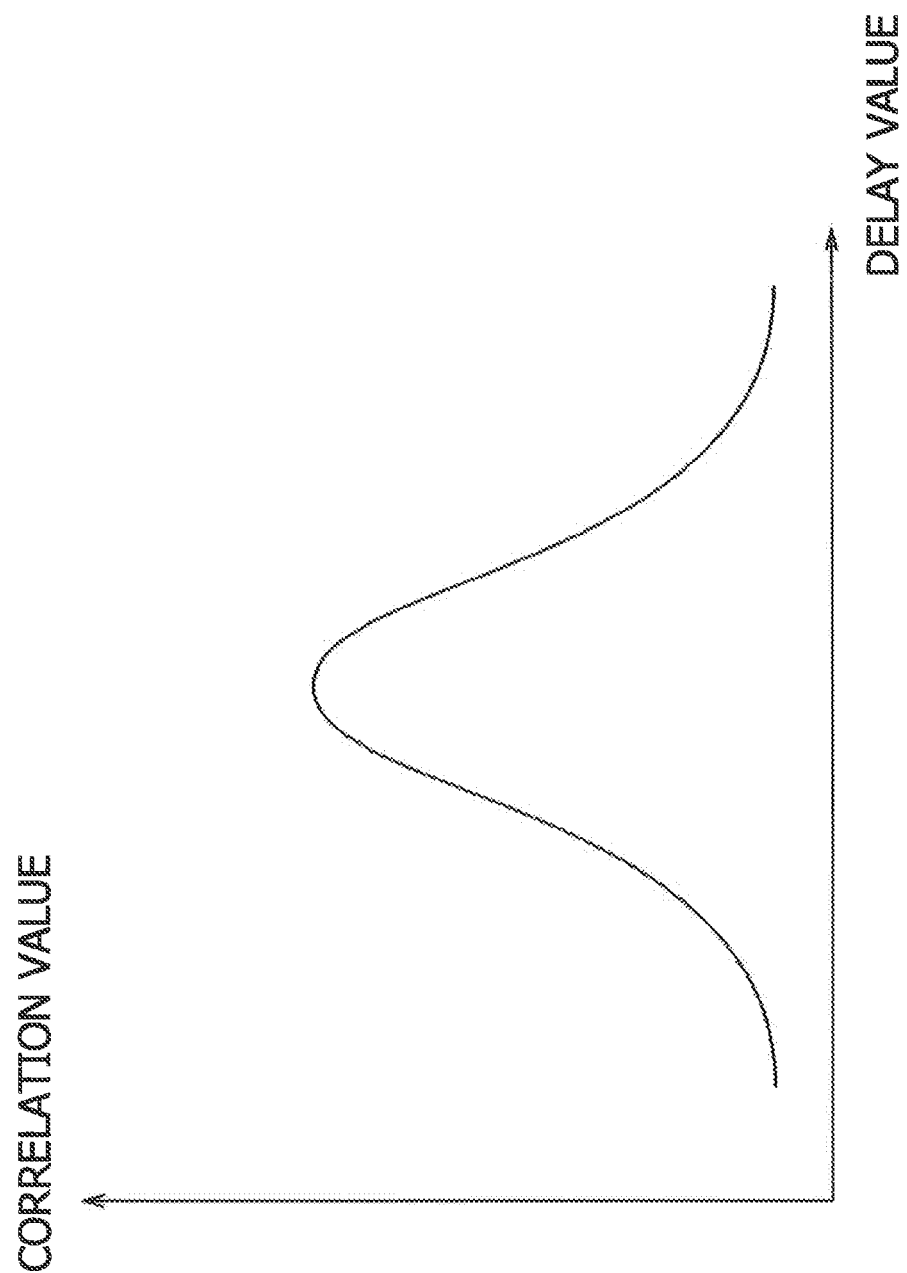
FIG. 1 is a diagram illustrating an example of dependency of a correlation value between a Ref signal and a FB signal on a delay of the FB signal with respect to the Ref signal.
Figure 2:
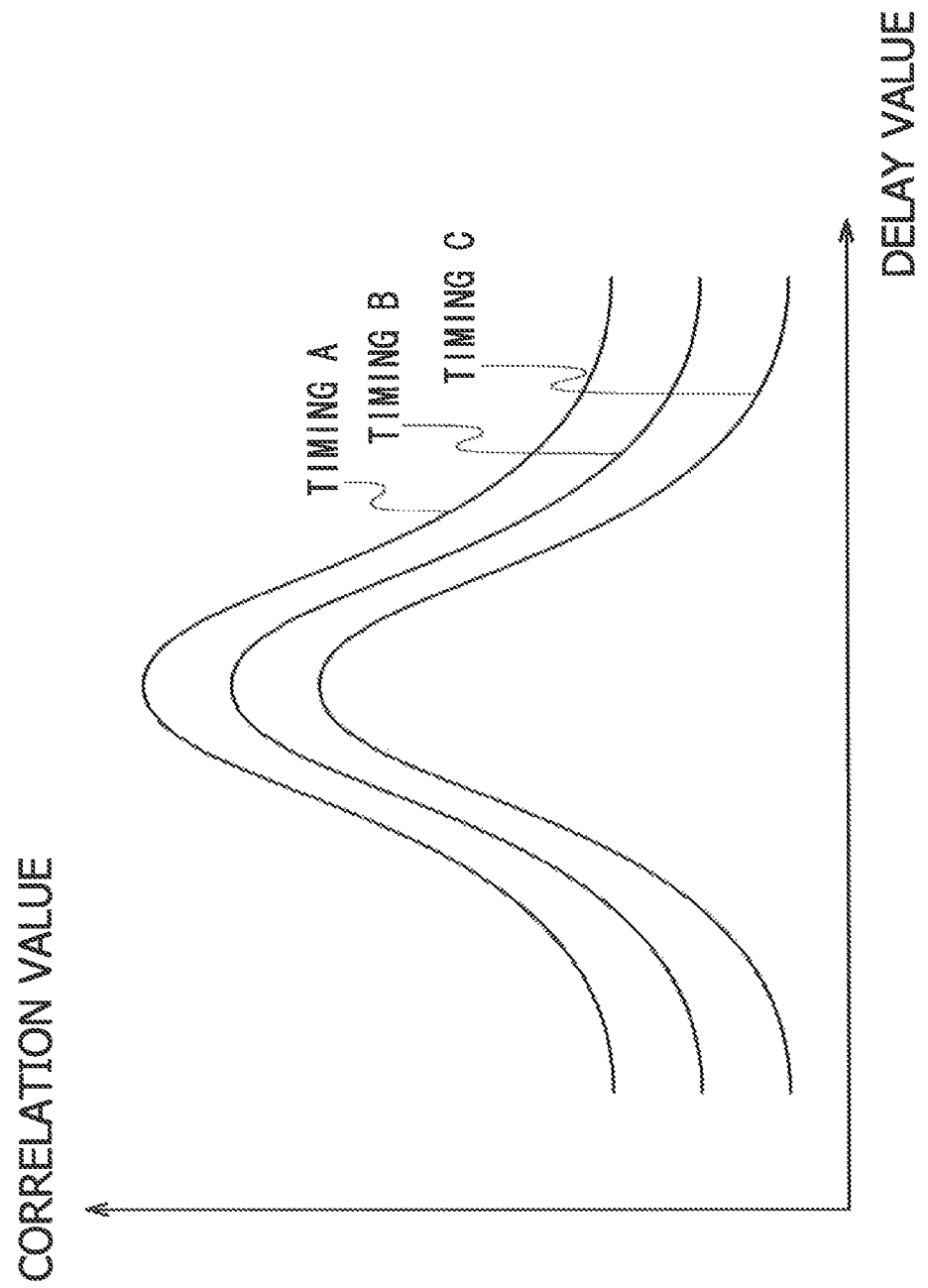
FIG. 2 is a diagram illustrating an example of the dependency of the correlation value between the Ref signal and the FB signal on the delay of the FB signal with respect to the Ref signal at a plurality of data acquisition timings.
Figure 3:
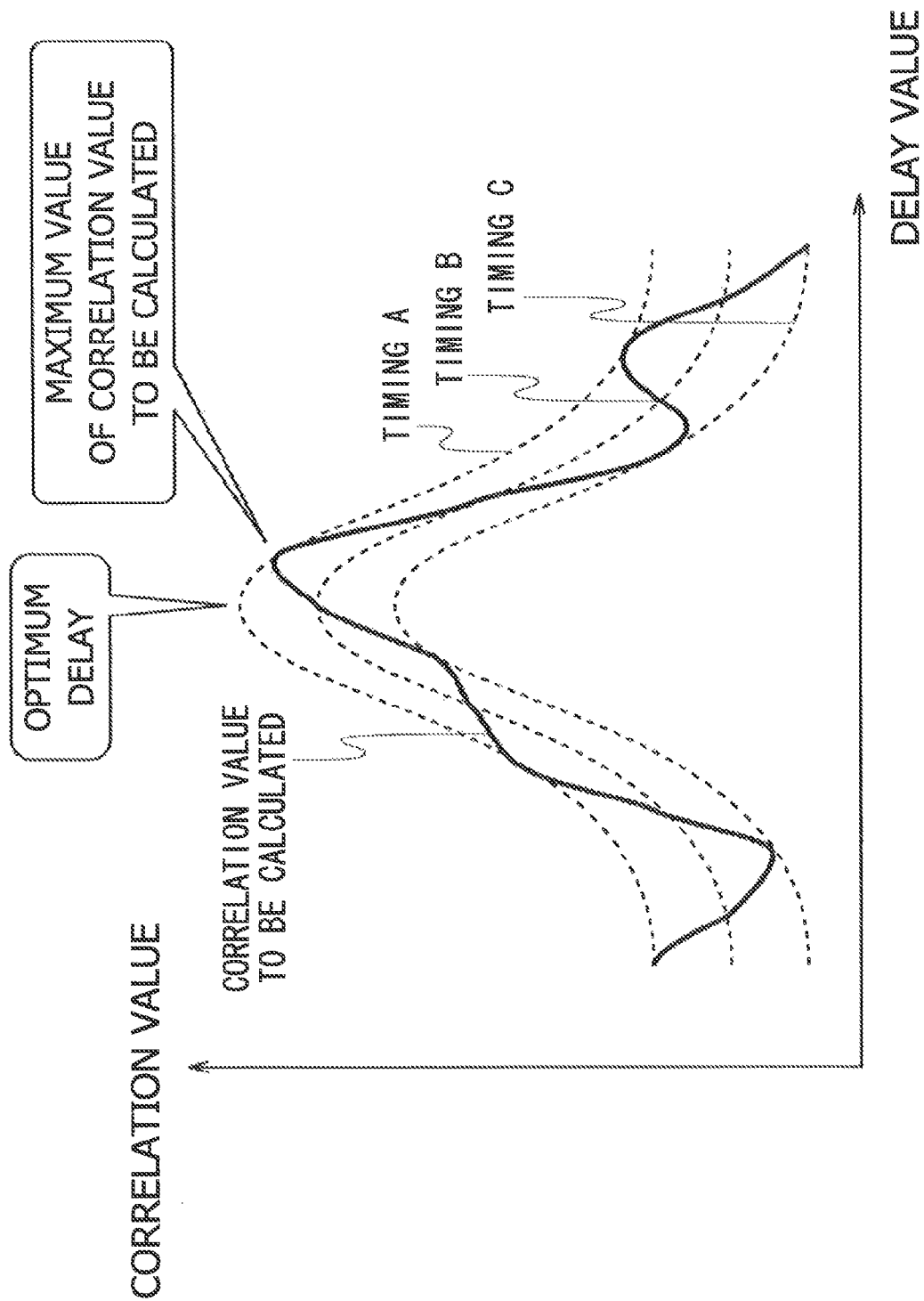
FIG. 3 is a diagram illustrating an example of how the correlation value changes when not storing the Ref signal and the FB signal in a memory but changing a delay quantity.
Figure 4:
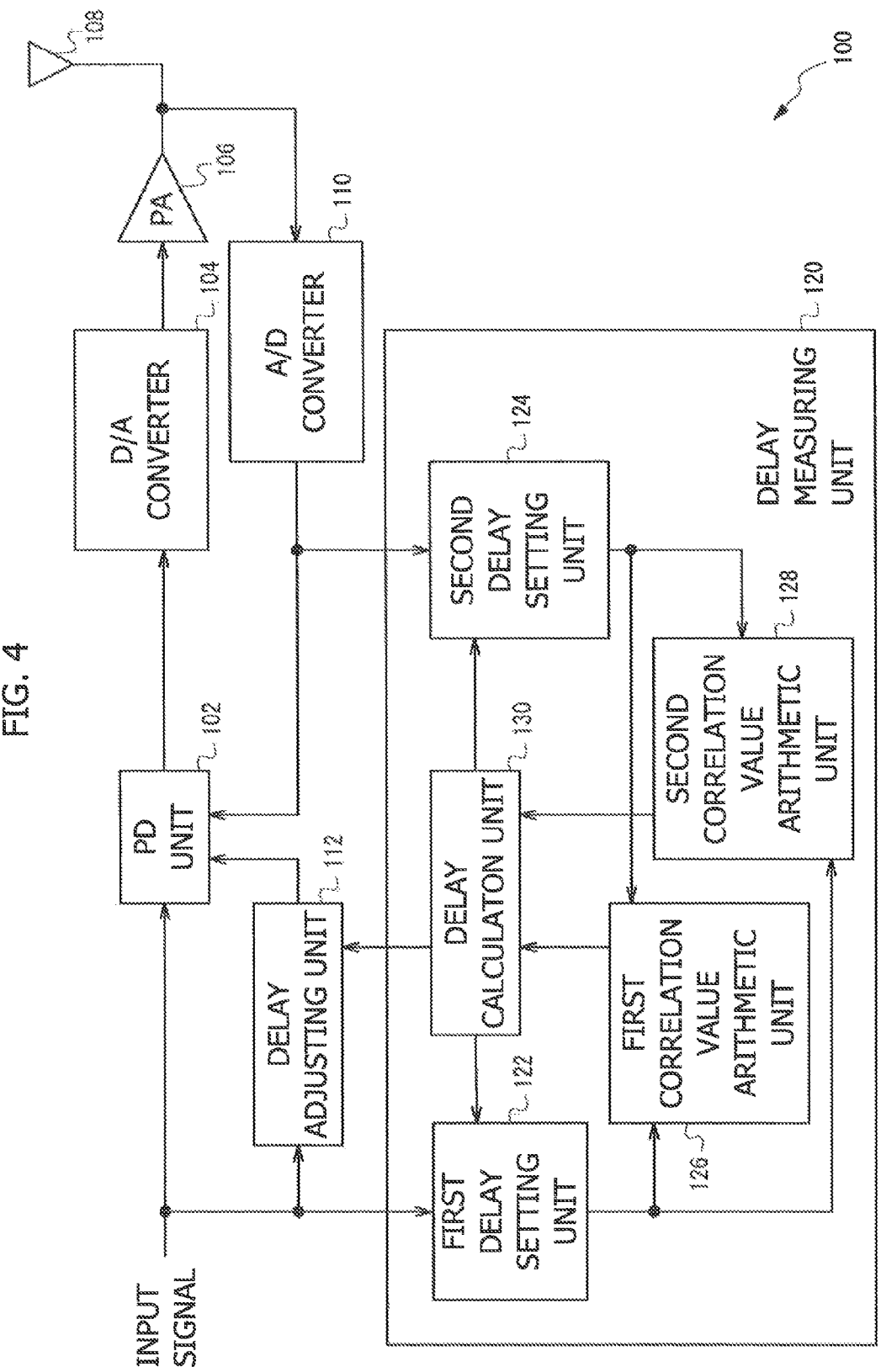
FIG. 4 is a diagram illustrating an example of a signal transmission apparatus.

FIG. 4 is a diagram illustrating an example of the signal transmission apparatus. A signal transmission apparatus 100 in FIG. 4 includes a PD (Pre-Distortion) unit 102, a D/A (Digital to Analog) converter 104, a PA (Power Amplifier) 106, an antenna 108, an A/D (Analog to Digital) converter 110, a delay adjusting unit 112, and a delay measuring unit 120. The delay measuring unit 120 includes a first delay setting unit 122, a second delay setting unit 124, a first correlation value arithmetic unit 126, a second correlation value arithmetic unit 128 and a delay calculation unit 130.

In the signal transmission apparatus 100, the PD unit 102 compensates distortions of digital input signals (a transmission baseband signal, a reference (Ref) signal), then the distortion-compensated signals are converted into analog signals by the D/A converter 104 and thereafter amplified by the PA 106, and the amplified signals are output from the antenna 108. In the signal transmission apparatus 100, the delay measuring unit 120 estimates a delay quantity of the output signal that is output from the PA 106 with respect to the input signal. In the signal transmission apparatus 100, the PD unit 102 compensates the distortions of the input signals on the basis of the Ref signal, feedback signals (FB signals) into which some of the output signals of the PA 106 are fed back and the delay quantity.

The PD unit 102 calculates a distortion compensation coefficient on the basis of the input signals output from the delay adjusting unit 112 and the FB signals output from the A/D converter 110. The PD unit 102 corrects the input signals so as to reduce nonlinear distortions of the output signals that are output from the PA 106. The post-correcting input signals are output to the D/A converter 104.

The D/A converter 104 converts the digital signals output from the PD unit 102 into the analog signals, and outputs the analog signals to the PA 106.

The PA 106 amplifies the analog signals output from the D/A converter 104, and outputs the amplified analog signals to the antenna 108 and the A/D converter 110.

The antenna 108 transmits the signals output from the PA 106 toward a peer communication device (a signal receiving device).

The A/D converter 110 converts the analog signals output from the PA 106 into the digital signals. The thus-converted digital signals are output to the PD unit 102 and the delay measuring unit 120.

The delay adjusting unit 112 delays the input signals by the delay quantity (optimum delay) calculated by the delay calculation unit 130 of the delay measuring unit 120, and outputs the delayed signals to the PD unit 102.

The delay measuring unit 120 calculates a delay quantity of the FB signal with respect to the Ref signal. The delay measuring unit 120 includes a first delay setting unit 122, a second delay setting unit 124, a first correlation value arithmetic unit 126, a second correlation value arithmetic unit 128 and a delay calculation unit 130. The delay measuring unit 120 is one example of a delay estimation unit.

The first delay setting unit 122 delays the Ref signal by the delay quantity indicated from the delay calculation unit 130, and outputs the delayed Ref signal to the first correlation value arithmetic unit 126 and the second correlation value arithmetic unit 128. Herein, a timing of the Ref signal, which is output from the first delay setting unit 122, is referred to as a timing x. The timing x is the timing obtained in a way that subtracts the delay quantity indicated by the delay calculation unit 130 from the present timing. This delay quantity is a quantity larger than the delay quantity of the FB signal with respect to the Ref signal. The timing x may also be indicated from the delay calculation unit 130.

The second delay setting unit 124 delays the FB signal by the delay quantity indicated from the delay calculation unit 130, and outputs the delayed FB signal to the first correlation value arithmetic unit 126 and the second correlation value arithmetic unit 128. Herein, a timing of the FB signal, which is output from the second delay setting unit 124, is referred to as a timing x+t. The timing x+t may also be indicated from the delay calculation unit 130.

The first correlation value arithmetic unit 126 obtains a correlation value between a Ref signal Ref(x) output from the first delay setting unit 122 and a FB signal FB(x+t) output from the second delay setting unit 124.

The second correlation value arithmetic unit 128 obtains a correlation value between the Ref signal Ref(x) output from the first delay setting unit 122 and a FB signal FB(x+t+a) output from the second delay setting unit 124. What is obtained herein is the correlation value between the FB signal delayed by time a from the FB signal output from the second delay setting unit 124 and the Ref signal. The time a takes a fixed value. The time a is, e.g., 1 clk (clock) of a sampling speed.

The delay calculation unit 130 indicates the delay quantity of the Ref signal to the first delay setting unit 122. The delay quantity indicated to the first delay setting unit 122 is well larger than the delay quantity of the FB signal with respect to the Ref signal. The delay calculation unit 130 indicates the delay quantity of the FB signal to the second delay setting unit 124. The delay quantity indicated to the second delay setting unit 124 takes a value obtained by adding time t to the delay quantity indicated to the first delay setting unit 122. The time t is changed on, e.g., the unit of "tap" (tap value). The time t, which is set for the first time, can take a value obtained by subtracting, e.g., 2 clk from the delay quantity obtained in the past.

The delay calculation unit 130 obtains a difference value between a correlation value calculated by the first correlation value arithmetic unit 126 and a correlation value calculated by the second correlation value arithmetic unit 128 at an interval of the time t. The delay calculation unit 130 scans the delay quantity indicated to the second delay setting unit 124 on the certain unit (e.g., the unit of "tap"), thus obtaining the difference value at an interval of the time t. The time t is manipulated based on the unit of "tap" till reaching "ts+4 clk" counted from the time is that is set for the first time. Supposing that the time t with the difference value being most approximate to "0" is set to time to, the optimum delay is obtained such as "t0+a/2". When the time t changes, the timing x may also change. Namely, when the time t changes, the timing may also change.

The delay calculation unit 130 notifies the delay adjusting unit 112 of the thus-obtained optimum delay.

The delay calculation unit 130 obtains the time tx with the difference value being maximized by changing the time t on the unit of "clk" (clock), and thereafter may change the time t before and after the time tx (e.g., till "tx+2 clk" from "tx−2 clk") on the unit of "tap". The correlation value with respect to the time exhibits a large change in the periphery of the time t with the difference value being maximized, and hence such a possibility is high that the time t0 with the optimum delay being acquired exists before and after the time tx.

Figure 5:
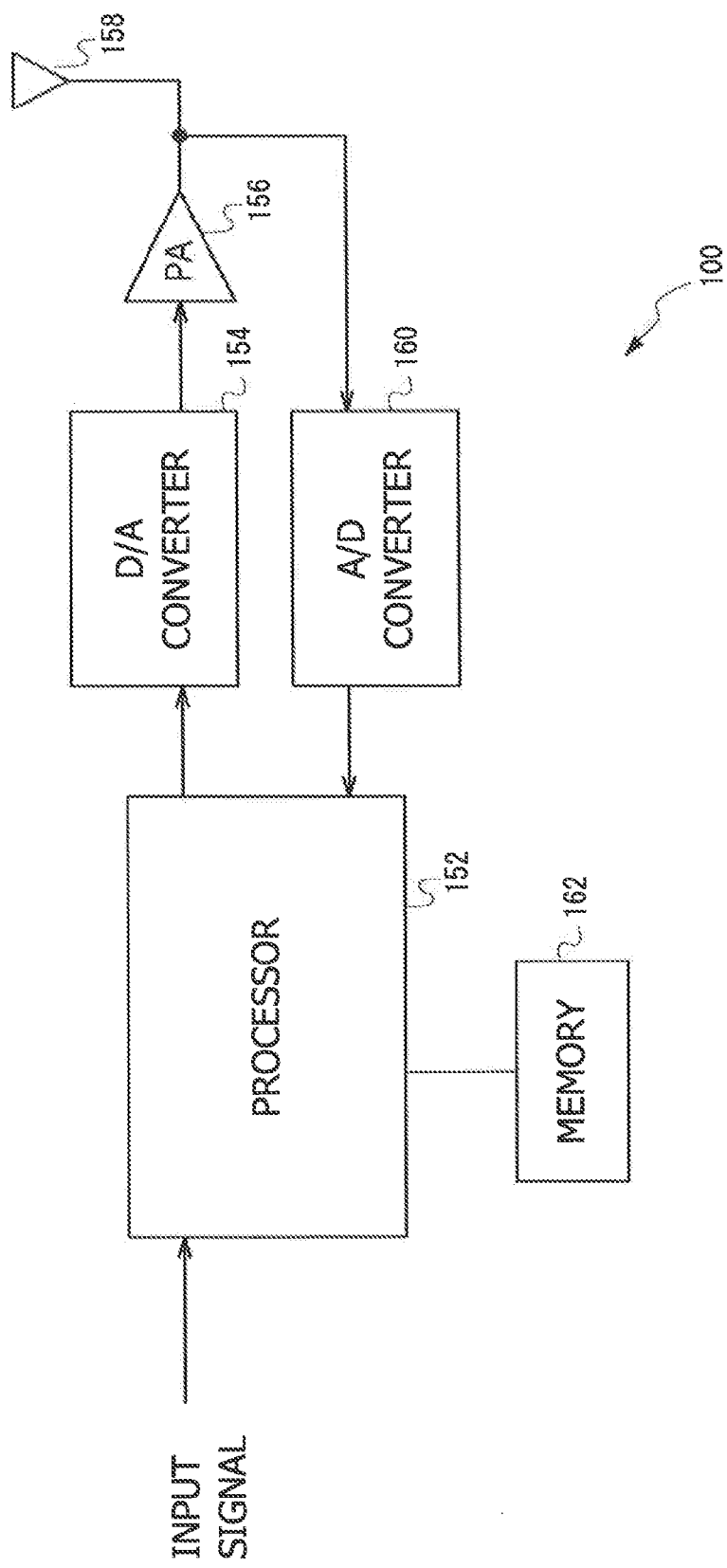
FIG. 5 is a diagram illustrating an example of a hardware configuration of the signal transmission apparatus.

FIG. 5 is a diagram illustrating an example of a hardware configuration of the signal transmission apparatus. The signal transmission apparatus 100 in FIG. 5 includes a processor 152, a D/A converter 154, the PA 156, an antenna 158, an A/D converter 160 and a memory 162.

The processor 152 performs a certain process over the input signal, and outputs the processed signal to the D/A converter 154. The processor 152 receives an input of the digital signal from the A/D converter 160. The processor 152 can operate as the PD unit 102, the delay adjusting unit 112 and the delay measuring unit 120 in FIG. 4. The processor 152 is realized by, e.g., an FPGA (Field-Programmable Gate Array), a CPU (Central Processing Unit), a DSP (Digital Signal Processor), an ASIC (Application Specific Integrated Circuit), etc. The processor 152 may also be realized by combining two or more pieces of components among the EPGA, the CPU, the DSP and the ASIC.

The D/A converter 154 converts the digital signals processed by the processor into the analog signals. The D/A converter 154 operates as the D/A converter 104 in FIG. 4.

The PA 156 amplifies the analog signals converted by the D/A converter 154. The PA 156 operates as the PA 106 in FIG. 4.

The antenna 158 transmits the signals output from the PA 156 toward other devices. The antenna 158 operates as the antenna 108 in FIG. 4.

The A/D converter 160 converts the signals obtained by feeding back some of the analog signals amplified by the PA 156 into the digital signals. The A/D converter 160 operates as the A/D converter 110 in FIG. 4.

The memory 162 is stored with programs, data, etc. that are used by the processor. The memory 162 can operate as a part of the PD unit 102, a part of the delay adjusting unit 112 and a part of the delay measuring unit 120 in FIG. 4. The memory 162 is realized by, e.g., a RAM (Random Access Memory) and a ROM (Read Only Memory).

(First Calculation Method)

Herein, a method of calculating an optimum delay t0 in the delay measuring unit 120 will be described. A difference value with respect to the time t is obtained as follows.

Difference Value($t$)=[Correlation Value between Ref($x$) and FB($x+t$)]−[Correlation Value between Ref($x$) and FB($x+t+a$)]    [Mathematical Expression 1]

where x represents the timing when acquiring the data, t stands for a difference between the delay quantity given by the first delay adjusting unit and the delay quantity given by the second delay adjusting unit, and a denotes a fixed delay quantity. The fixed delay quantity a involves using "1 clk" of the sampling speed. The timing x in the first term of the right side takes the same value as the value of the timing x in the second term of the right side.

The delay measuring unit 120 scans the time t on, e.g., the unit of "tap", thus obtaining the time t with the difference value (t) being most approximate to "0". Let "t0" be the time t with the difference value (t) being most approximate to "0". At this time, the optimum delay is obtained as follows.

$$\text{Optimum Delay} = t0 + \frac{a}{2} \quad \text{[Mathematical Expression 2]}$$

Accordingly, the formula of the difference value (t0) is transformed as follows.

[Mathematical Expression 3]

$$\text{Difference Value } (t0) = \left[ \text{Correlation Value between } Ref(x) \text{ and } FB\left(x + \text{OptimumDelay} - \frac{a}{2}\right)\right] - \left[\text{Correlation Value between } Ref(x) \text{ and } FB\left(x + \text{Optimum Delay} - \frac{a}{2} + a\right)\right] = \left[\text{Correlation Value between } Ref(x) \text{ and } FB\left(x + \text{Optimum Delay} - \frac{a}{2}\right)\right] - \left[\text{Correlation Value beteween } Ref(x) \text{ and } FB\left(x + \text{Optimum Delay} + \frac{a}{2}\right)\right]$$

A graph of the correlation value with respect to the delay value is approximately linearly symmetric with respect to the optimum delay value. Hence, the correlation value with the delay value distanced by a negative certain value (e.g., −a/2) from the optimum delay value is approximately equal to the correlation value with the delay value distanced by a positive certain value (e.g., +a/2) from the optimum delay value.

Namely, a difference between these correlation values becomes approximately "0". This principle being exploited, the time t with the difference value (t) being most approximate to "0" is obtained by scanning the time t, whereby the optimum delay is acquired.

Figure 6:
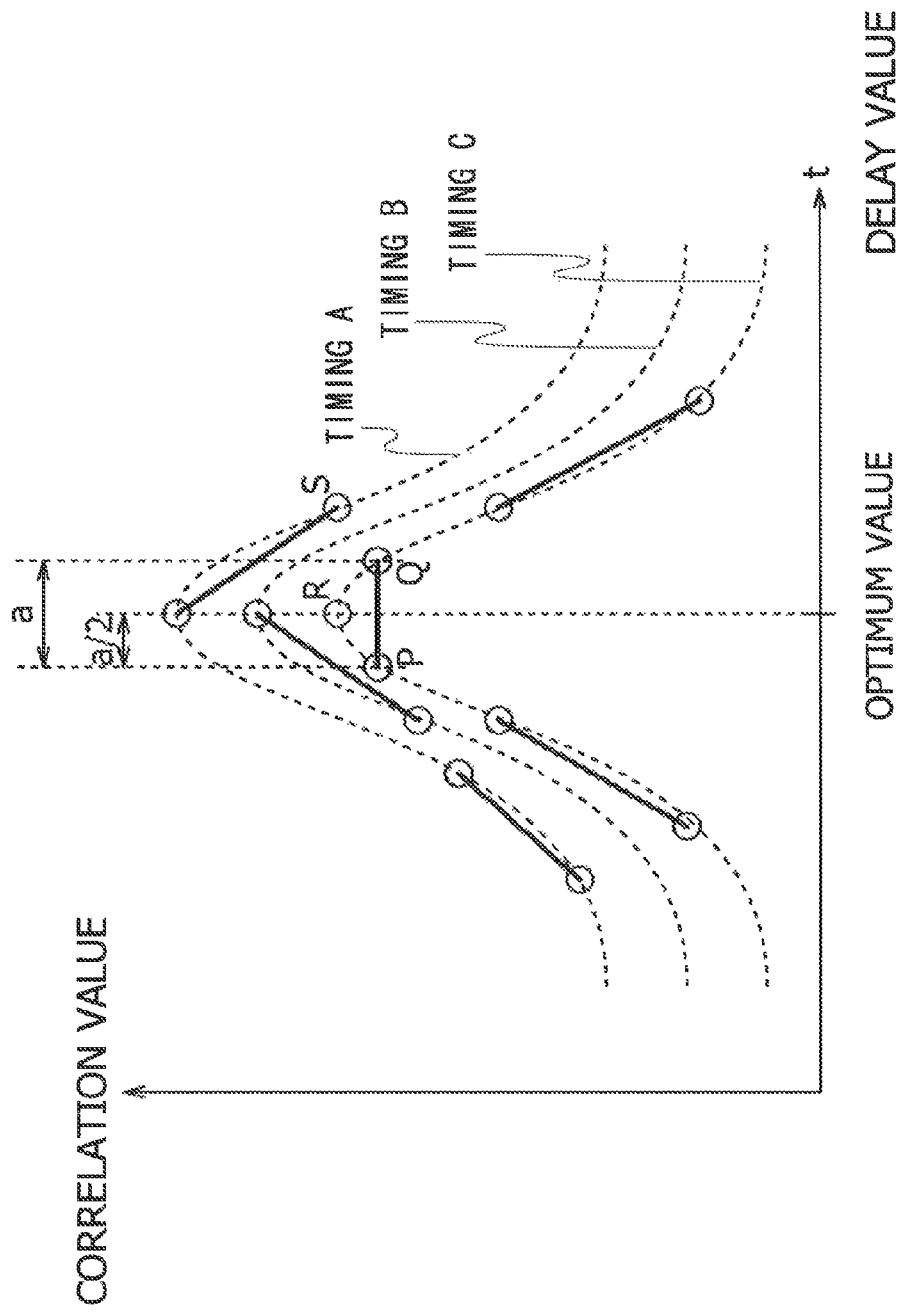
FIG. 6 is an explanatory diagram of how the difference value is calculated.

FIG. 6 is an explanatory diagram of how the difference value is calculated. In FIG. 6, the symbol a represents a time difference between two points connected by a solid line. In FIG. 6, what is obtained as the difference value (t) by the delay calculation unit 130 is a difference between the correlation values at the two points connected by the solid line. The correlation value at the left-sided point of the two points connected by the solid line is the correlation value calculated by the first correlation value arithmetic unit 126, and the correlation value at the right-sided point is the correlation value calculated by the second correlation value arithmetic unit 128. The difference value (t) with respect to the delay value t at the left-sided point is a difference between the correlation value at the left-sided point and the correlation value at the right-sided point. Herein, the timing x in the first correlation value arithmetic unit 126 takes the same value as the value of the timing x in the second correlation value arithmetic unit 128, and hence the two points connected by the solid line exist on a curve of the identical timing. If the value of the timing x in the first correlation value arithmetic unit 126 is equal to the value of the timing x in the second correlation value arithmetic unit 128, the correlation values calculated respectively exist on the curves of the identical timings. The value of the timing x in the first correlation value arithmetic unit 126 is equal to the value of the timing x in the second correlation value arithmetic unit 128, which implies that the timing is identical. In the first embodiment, the delay calculation unit 130 obtains the difference between the two correlation values at the identical timing.

For example, it is assumed in FIG. 6 that a point P corresponds to the correlation value calculated by the first correlation value arithmetic unit 126, while a point Q corresponds to the correlation value calculated by the second correlation value arithmetic unit 128. As in FIG. 6, the difference value between the correlation value at the point P and the correlation value at the point Q is approximately "0". Furthermore, the symbol a represents a difference between the delay value at the point P and the delay value at the point Q. Hence, what a/2 is added to the delay value at the point P is the optimum delay. What a/2 is added to the delay value at the point P corresponds to a delay value at a middle point of a line segment connecting the point P to the point Q.

Further, for example, it is assumed that in FIG. 6 that a point R corresponds to the correlation value calculated by the first correlation value arithmetic unit 126, while a point S corresponds to the correlation value calculated by the second correlation value arithmetic unit 128. Herein, the point R and the point S shall be the correlation values at different timings. As in FIG. 6, the point R and the point S exist on the curves of the different timings. At this time, as in FIG. 6, the difference value between the correlation value at the point R and the correlation value at the point S is approximately "0". Moreover, the symbol a represents a difference between the delay value at the point R and the delay value at the point S. What a/2 is added to the delay value at the point R is, however, distanced from the actual optimum delay. Accordingly, if the timing is different in the first correlation value arithmetic unit 126 and in the second correlation value arithmetic unit 128, the optimum delay cannot be obtained with high accuracy. Namely, if the difference value is obtained by use of the correlation values calculated at the different timings, the optimum delay gets hard to be obtained with the high accuracy. It does not happen in the first embodiment that the delay calculation unit 130 obtains the difference between the correlation value at the point R and the correlation value at the point S.

In FIG. 6, the difference between the delay values at the two points connected by the solid line are equally "a", and therefore the difference between the correlation values at the two points connected by the solid line is proportional to a gradient of the solid line connecting the two points. Namely, the difference value is proportional to the gradient of the solid line connecting the two points.

A method of obtaining the optimum delay is exemplified by, e.g., (1) a method by which the time t given when a sign of the difference value (t) changes is set to t0 and (2) a method by which the time t given when an absolute value of the difference value (t) is minimized is set to t0.

Figure 7:
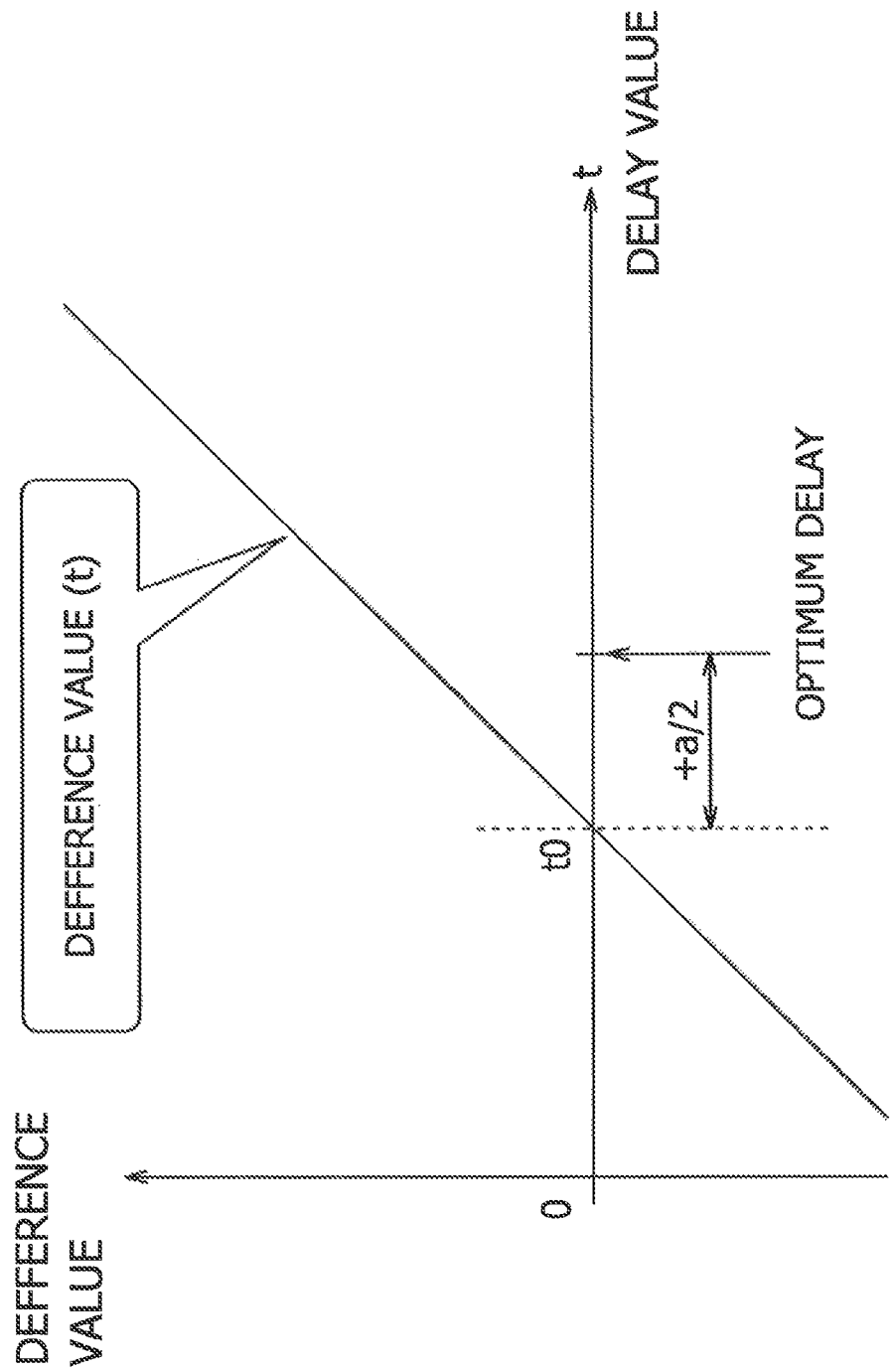
FIG. 7 is an explanatory diagram of a method by which time t given when a sign of a difference value (t) changes is set to t0.

FIG. 7 is an explanatory diagram of the method by which the time t given when the sign of the difference value (t) changes is set to t0. A graph in FIG. 7 depicts a relationship between the delay value and the difference value, in which the axis of abscissa indicates the delay value, and the axis of ordinate indicates the difference value. An assumption herein is that the first correlation value arithmetic unit 126 obtains the difference value (t) while increasing the time t on, e.g., the unit of "tap". Herein, the time t given when the sign of the difference value changes (e.g., when changing to positive from negative) shall be set to t0. At this time, the optimum delay is given by t0+a/2.

Figure 8:
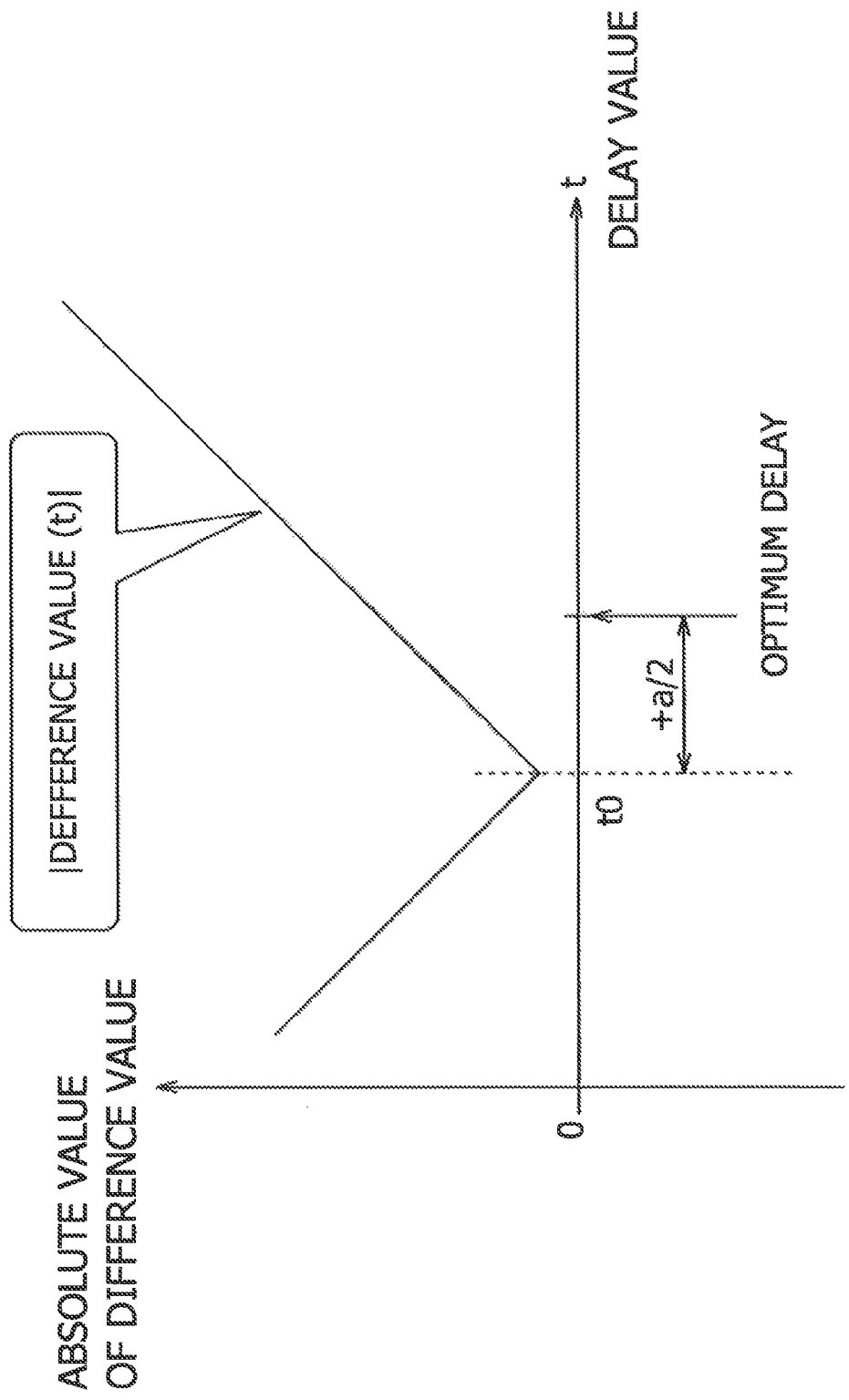
FIG. 8 is an explanatory diagram of a method by which the time t given when an absolute value of the difference value (t) is minimized is set to t0.

FIG. 8 is an explanatory diagram of the method by which the time t given when the absolute value of the difference value (t) is minimized is set to t0. A graph in FIG. 8 illustrates a relationship between the absolute value of the delay value and the difference value, in which the axis of abscissa indicates the delay value, and the axis of ordinate indicates the absolute value of the difference value. The assumption herein is that the delay calculation unit 130 delay calculation unit 130 obtains the absolute value of the difference value (t) while increasing the time t on, e.g., the unit of "tap". Herein, the time t given when the absolute value of the difference value is minimized shall be set to t0. At this time, the optimum delay is given by t0+a/2.

Further, the difference value (t) may also be defined as below. It is herein assumed that the first correlation value arithmetic unit 126 calculates the correlation value between Ref(x) and FB(x+t), and the second correlation value arithmetic unit 128 calculates the correlation value between Ref (x) and FB(x+t−a).

Difference Value($t$)=[Correlation Value between Ref ($x$) and FB($x+t$)]−[Correlation Value between Ref($x$) and FB($x+t-a$)]    [Mathematical Expression 4]

At this time, when the time t with the difference value (t) being most approximate to "0" is set to t0, the optimum delay is obtained in the way described below.

$$\text{Optimum Delay} = t0 - \frac{a}{2}$$    [Mathematical Expression 5]

Operational Example 1-1

An operational example 1-1 of the delay measuring unit 120 of the signal transmission apparatus 100 will be described.

Figure 9:
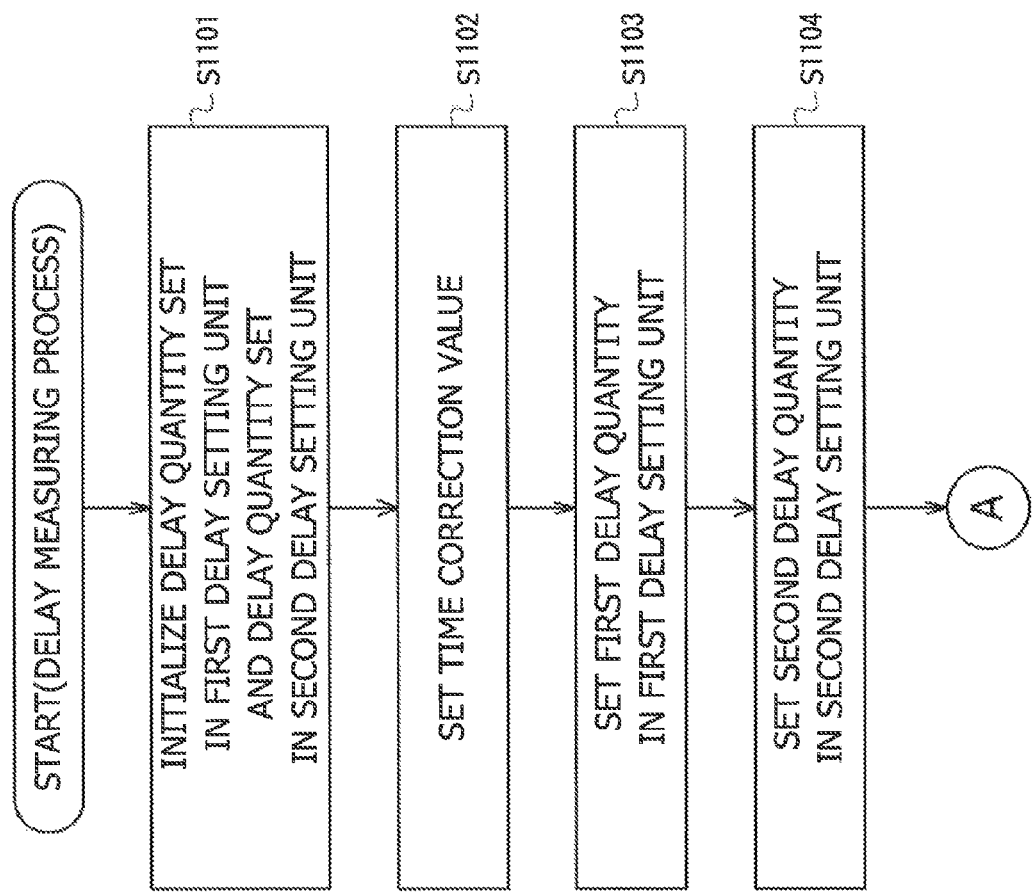
FIG. 9 is a flowchart illustrating an example (1) of an operating flow of a delay measuring process of a delay measuring unit 120 of a signal transmission apparatus 100.
Figure 10:
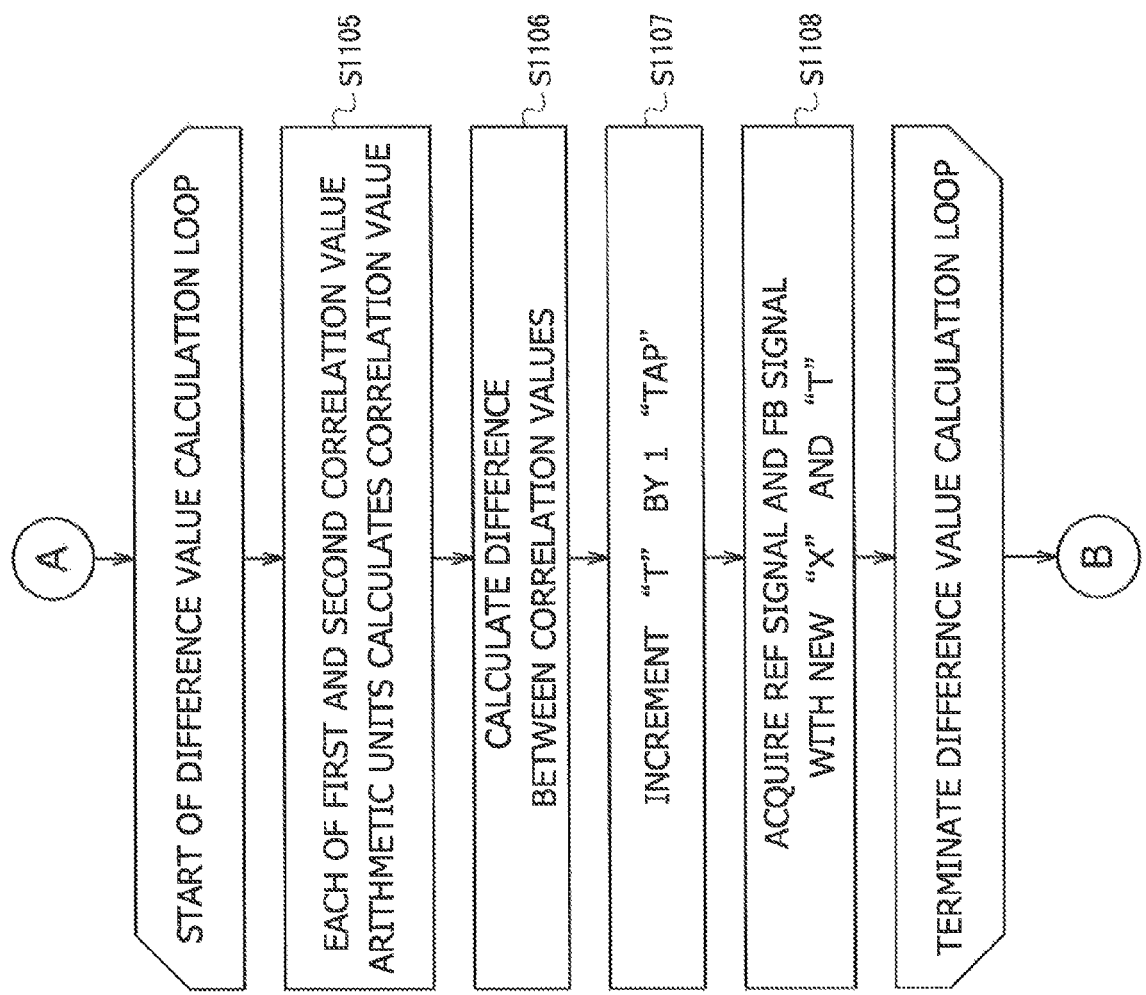
FIG. 10 is a flowchart illustrating an example (2) of the operating flow of the delay measuring process of the delay measuring unit 120 of the signal transmission apparatus 100.
Figure 11:
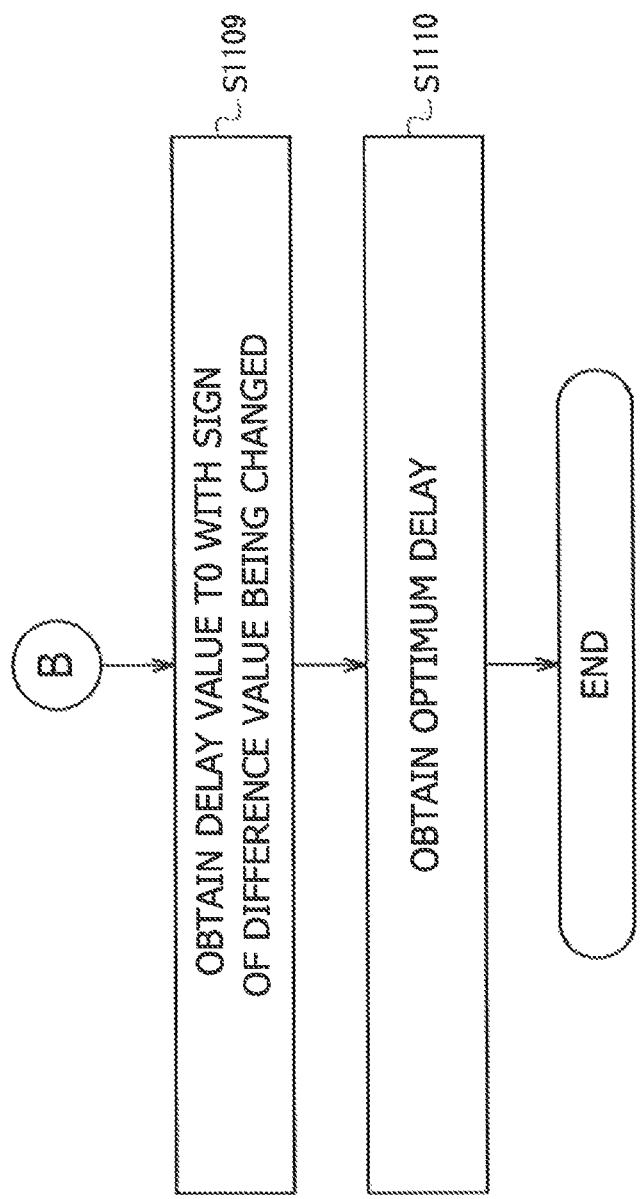
FIG. 11 is a flowchart illustrating an example (3) of the operating flow of the delay measuring process of the delay measuring unit 120 of the signal transmission apparatus 100.

FIGS. 9, 10 and 11 are flowcharts each illustrating an example of an operating flow of a delay measuring process of the delay measuring unit 120 of the signal transmission apparatus 100. A symbol [A] in FIG. 9 is continued to [A] in FIG. 10. A symbol [B] in FIG. 10 is continued to [B] in FIG. 11.

The delay calculation unit 130 of the delay measuring unit 120 initializes a first delay quantity set in the first delay setting unit 122 and a second delay quantity set in the second delay setting unit 124 (S1101). The delay measuring unit 120 sets a time correction value ts (S1102). The time correction value ts is set to a value given by subtracting, e.g., 2 clk from the optimum delay that has been calculated before. Further, the time correction value ts may also be a quantity given beforehand based on the configuration etc. of the signal transmission apparatus 100.

The delay calculation unit 130 notifies the first delay setting unit 122 of the first delay quantity (S1103). The delay calculation unit 130 sets the first delay quantity to, e.g., 3 clk. The first delay setting unit 122 delays the Ref signal with the first delay quantity indicated from the delay calculation unit 130, and outputs the delayed Ref signal to the first correlation value arithmetic unit 126 and the second correlation value arithmetic unit 128. Herein, the timing of the Ref signal output from the first delay setting unit 122 is set to the timing x. The timing x is the timing given by subtracting, from the present timing, the first delay quantity indicated from the delay calculation unit 130. The delay calculation unit 130 may also notify the first delay setting unit 122 of the timing x. Let Ref(x) be the Ref signal that is output from the first delay setting unit 122.

The delay calculation unit 130 notifies the second delay setting unit 124 of the second delay quantity (S1104). The delay calculation unit 130 sets the second delay quantity to a value given by subtracting the first delay quantity from the time correction value ts. The second delay setting unit 124 delays the FB signal with the second delay quantity indicated from the delay calculation unit 130, and outputs the delayed FB signal to the first correlation value arithmetic unit 126 and the second correlation value arithmetic unit 128. The timing of the FB signal output from the first delay setting unit 122 becomes a timing x+ts. The delay calculation unit 130 may also notify the second delay setting unit 124 of the timing x+ts. Let FB(x+t) be the FB signal output from the second delay setting unit 124. Herein, the time t is set to the time ts.

A difference value calculation loop starts from here.

The first correlation value arithmetic unit 126 obtains the correlation value between a Ref signal Ref(x) output from the first delay setting unit 122 and an FB signal FB(x+t) output from the second delay setting unit 124. The first correlation value arithmetic unit 126 outputs the thus-obtained correlation value to the delay calculation unit 130. The second correlation value arithmetic unit 128 obtains the correlation value between the Ref signal Ref(x) output from the first delay setting unit 122 and the FB signal FB(x+t) output from the second delay setting unit 124 (S1105). The second correlation value arithmetic unit 128 obtains the correlation value between the FB signal delayed by the time a from the FB signal output from the second delay setting unit 124 and the Ref signal. The time a takes a fixed value. The time a is, e.g., 1 clk (clock) of the sampling speed. The second correlation value arithmetic unit 128 outputs the thus-obtained correlation value to the delay calculation unit 130.

The delay calculation unit 130 calculates a difference between the correlation value obtained by the first correlation value arithmetic unit 126 and the correlation value obtained by the second correlation value arithmetic unit 128, and sets this calculated difference as the difference value (t) with respect to the delay value t (S1106).

The delay calculation unit 130 sets what a 1-tap value is added to the time t as a new time t (S1107). The delay calculation unit 130 notifies the first delay setting unit 122 of the first delay quantity. The first delay quantity may be the same as the first delay quantity given in step S1103. The delay calculation unit 130 notifies the second delay setting unit 124 of the second delay quantity. The second delay quantity shall be a value given by subtracting the first delay quantity from the time L. Further, the timing x and the timing "x+t" may also be used in place of the first delay quantity and the second delay quantity.

The first delay setting unit 122 and the second delay setting unit 124 output the Ref signal and the FB signal respectively on the basis of the new time t and the new timing x. The first correlation value arithmetic unit 126 and the second correlation value arithmetic unit 128 acquire the Ref signal and the FB signal on the basis of the new time t and the new timing x (S1108).

The difference value calculation loop terminates when the time t becomes, e.g., "ts+4 clk".

When the difference value calculation loop terminates, the delay calculation unit 130 increments the time t on a tap-by-tap basis from "t=ts" with respect to the difference value (t) calculated in the difference value calculation loop and sets, to the delay value to, the time t given when the sign of the difference value (t) changes (S1109).

The delay calculation unit 130 calculates "t0+a/2" as the optimum delay (S1110). The delay calculation unit 130 notifies the delay adjusting unit 112 of the optimum delay.

Thus, the delay measuring unit 120 calculates the optimum delay and notifies the delay adjusting unit 112 of the optimum delay.

Operational Example 1-2

An operational example 1-2 of the delay measuring unit 120 of the signal transmission apparatus 100 will be described. Explanations of points common to the operational example 1-1 are omitted.

Figure 12:
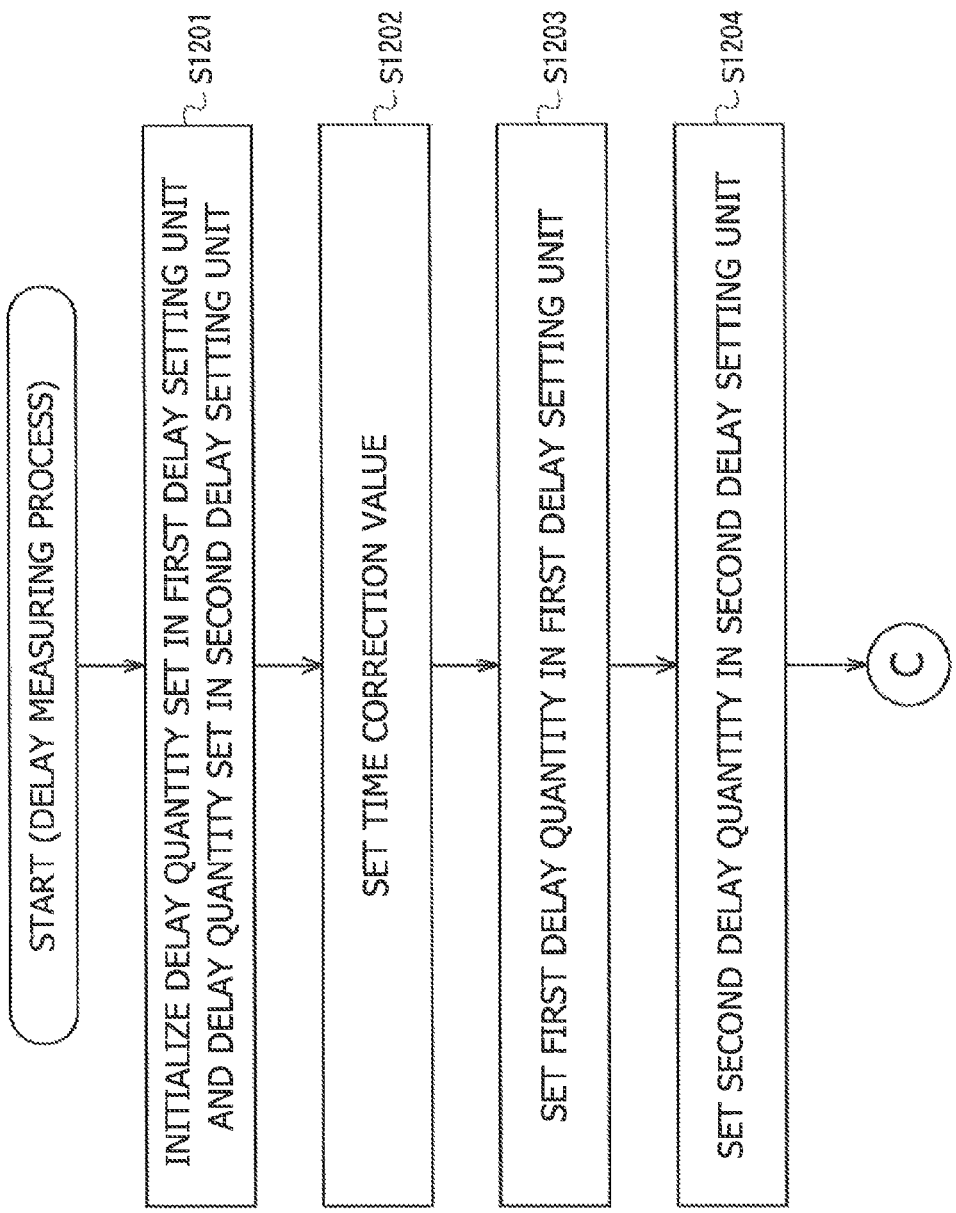
FIG. 12 is a flowchart illustrating an example (1) of an operating flow of another delay measuring process of the delay measuring unit 120 of the signal transmission apparatus 100.
Figure 13:
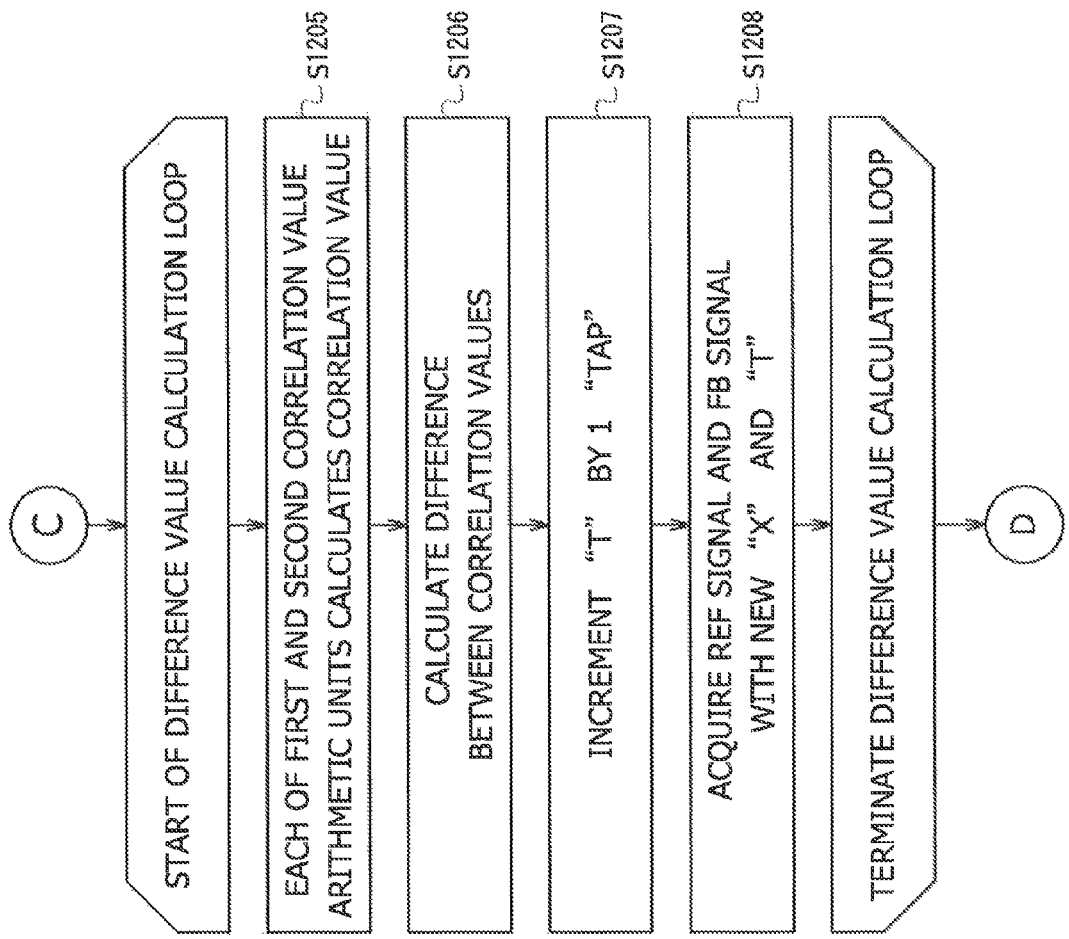
FIG. 13 is a flowchart illustrating an example (2) of the operating flow of the delay measuring process of the delay measuring unit 120 of the signal transmission apparatus 100.
Figure 14:
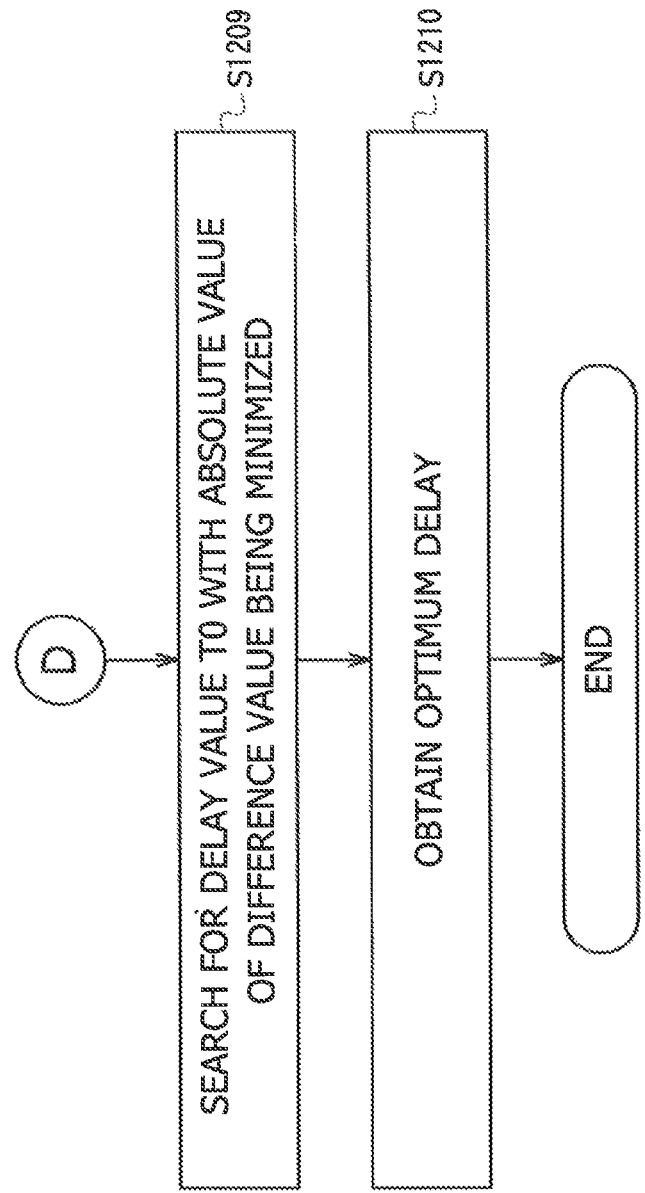
FIG. 14 is a flowchart illustrating an example (3) of the operating flow of the delay measuring process of the delay measuring unit 120 of the signal transmission apparatus 100.

FIGS. 12, 13 and 14 are flowcharts each illustrating an example of an operating flow of the delay measuring process of the delay measuring unit 120 of the signal transmission apparatus 100. A symbol [C] in FIG. 12 is continued to [C] in FIG. 13. A symbol [D] in FIG. 13 is continued to [D] in FIG. 14.

Steps S1201 through S1208 are the same as steps S1101 through S1108 of the operational example 1-1.

When the difference value calculation loop terminates, the delay calculation unit 130 takes an absolute value with respect to the difference value (t) calculated in the difference value calculation loop. The delay calculation unit 130 sets, to the delay value to, the time t given when the absolute value of the difference value (t) is minimized (S1209).

The delay calculation unit 130 calculates "t0+a/2" as the optimum delay (S1210). The delay calculation unit 130 notifies the delay adjusting unit 112 of the optimum delay.

Thus, the delay measuring unit 120 calculates the optimum delay and notifies the delay adjusting unit 112 of the optimum delay.

Operation and Effect of First Embodiment

The signal transmission apparatus 100 calculates the two correlation values by use of the signals delayed with the two delay values having a certain difference in a way that employs the Ref signal and the FB signal, which are acquired at the identical timing. The signal transmission apparatus 100 calculates the difference value between the two correlation values. The signal transmission apparatus 100 calculates the difference value by scanning the delay values. The signal transmission apparatus 100 calculates the optimum delay on the basis of the delay values given when the difference value between the correlation values is most approximate to "0".

According to the signal transmission apparatus 100, the correlation values are calculated by using the signals acquired at the identical timing, and the difference value therebetween is calculated, whereby the delay quantity of the FB signal with respect to the Ref signal can be calculated with the high accuracy.

According to the signal transmission apparatus 100, the correlation values are calculated by using the FB signal and the Ref signal, which are acquired at the new timing, each time the difference value is calculated. According to the signal transmission apparatus 100, it may be sufficient that the FB signal and the Ref signal are acquired each time the difference value is calculated, thereby enabling a circuit scale to be made smaller than a configuration for previously storing the FB signal and the Ref signal and making the calculation.

In the configuration described above, the delay measuring unit 120 may also obtain the optimum delay by calculating the correlation value in a way that fixes the FB signal but changes the Ref signal, with the timing x being set to a timing "x−t". At this time, the timing x may also be "0". Further, in the configuration described above, the delay measuring unit 120 may obtain the optimum delay t0 by calculating the correlation values in a way that changes the FB signal and the Ref signal, with the timing x being set to a timing "x−αt". The parameter α is, e.g., equal to or larger than 0 but equal to or smaller than 1.

Second Embodiment

Next, a second embodiment will be described. The second embodiment has points common to the first embodiment. Accordingly, the discussion will be focused on different points, while the explanations of the common points are omitted.

Example 2 of Configuration

Figure 15:
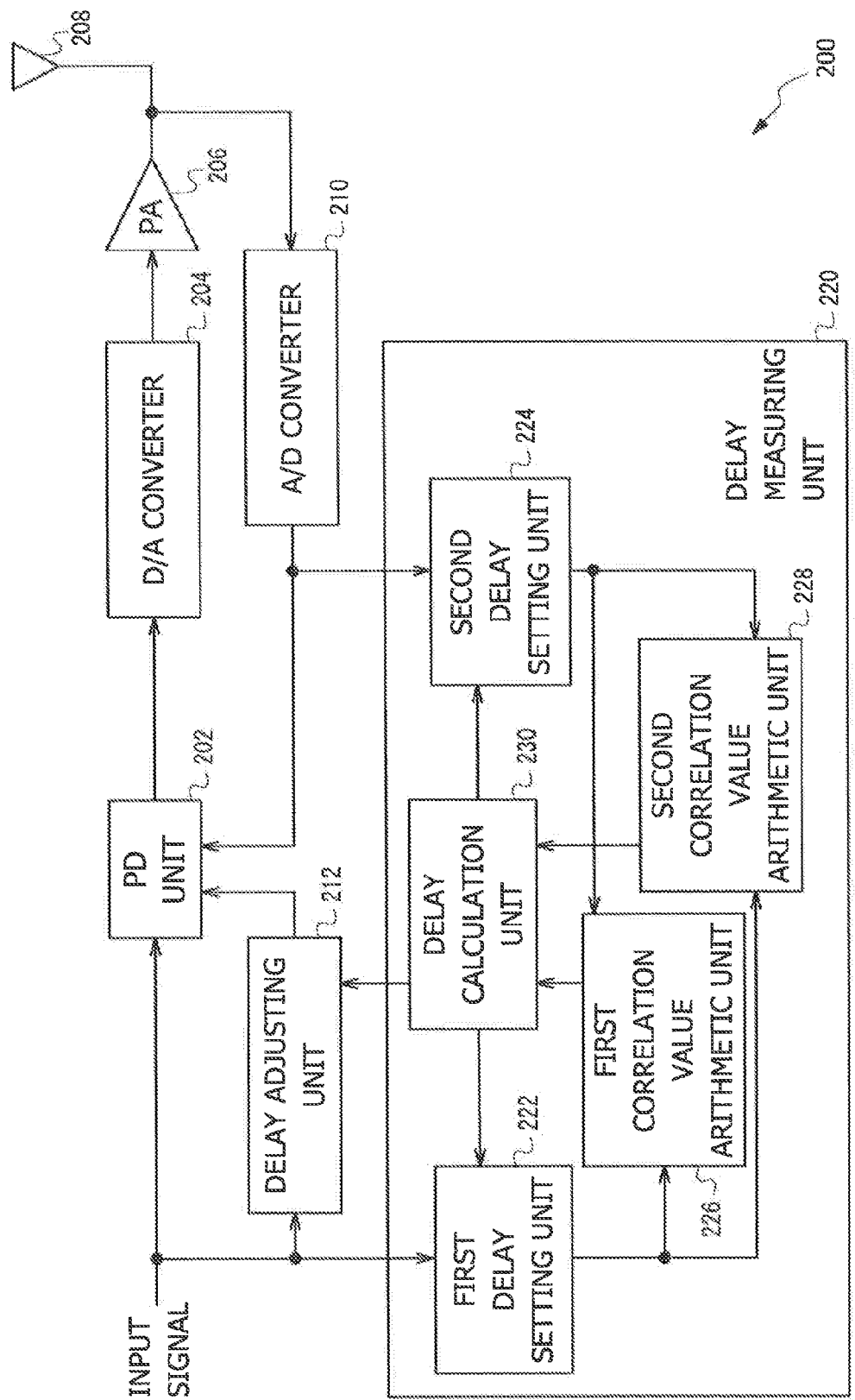
FIG. 15 is a diagram illustrating an example of the signal transmission apparatus.

FIG. 15 is a diagram illustrating an example of the signal transmission apparatus. A signal transmission apparatus 200 in FIG. 15 includes a PD (Pre-Distortion) unit 202, a D/A (Digital to Analog) converter 204, a PA (Power Amplifier) 206, an antenna 208, an A/D (Analog to Digital) converter 210, a delay adjusting unit 212, and a delay measuring unit 220. The delay measuring unit 220 includes a first delay setting unit 222, a second delay setting unit 224, a first correlation value arithmetic unit 226, a second correlation value arithmetic unit 228 and a delay calculation unit 230. The delay measuring unit 220 is one example of a delay estimating unit.

The delay measuring unit 220 calculates a first difference value and a second difference value that will be described later on, then obtains the optimum delay, and outputs the optimum delay to the delay adjusting unit 212.

The signal transmission apparatus 200 can be realized by the same hardware configuration as the configuration in FIG. 5.

(Calculation Method 2)

Herein, a method of calculating the optimum delay t0 in the delay measuring unit 220 will be described. Herein, the two difference values (the first difference value and the second difference value) are obtained. The first difference value with respect to the time t is obtained as follows.

[Mathematical Expression 6]

First Difference Value (t) = [

Correlation Value between $Ref(x)$ and $FB(x+t)$] −

[Correlation Value between $Ref(x)$ and $FB(x+t+a)$]

Second Difference Value (t) = [

Correlation Value between $Ref(x)$ and $FB(x+t)$] −

[Correlation Value between $Ref(x+a)$ and $FB(x+t)$]

where x represents a timing when acquiring the data, t denotes a difference between the delay quantity given by the first delay adjusting unit and the delay quantity given by the second delay adjusting unit, and a designates a fixed delay quantity. The fixed delay quantity a involves using, e.g., 1 clk of the sampling speed. The timing x in the first term of the right side takes the same value as the value of the timing x in the second term of the right side.

The delay measuring unit 220 scans the time t on, e.g., the unit of "tap", thus obtaining the time t with the first difference value (t) being most approximate to "0". Let "t10" be the time t with the first difference value (t) being most approximate to "0". Further, the delay measuring unit 220 scans the time t on, e.g., the unit of "tap", thus obtaining the time t with the second difference value (t) being most approximate to "0". Let "t20" be the time t with the second difference value (t) being most approximate to "0". At this time, the optimum delay is obtained as follows.

$$\text{Optimum Delay} = \frac{t10 + t20}{2} \qquad [\text{Mathematical Expression 7}]$$

The method of obtaining the optimum delay is exemplified by, e.g., (1) a method by which the time t given when the sign of the first difference value (t) changes is set to t10 and the time t given when the sign of the second difference value (t) changes is set to t20. Furthermore, the method of obtaining the optimum delay is exemplified by (2) a method by which the time t given when an absolute value of the first difference value (t) is minimized is set to t10 and the time t given when an absolute value of the second difference value (t) is minimized is set to t20.

Figure 16:
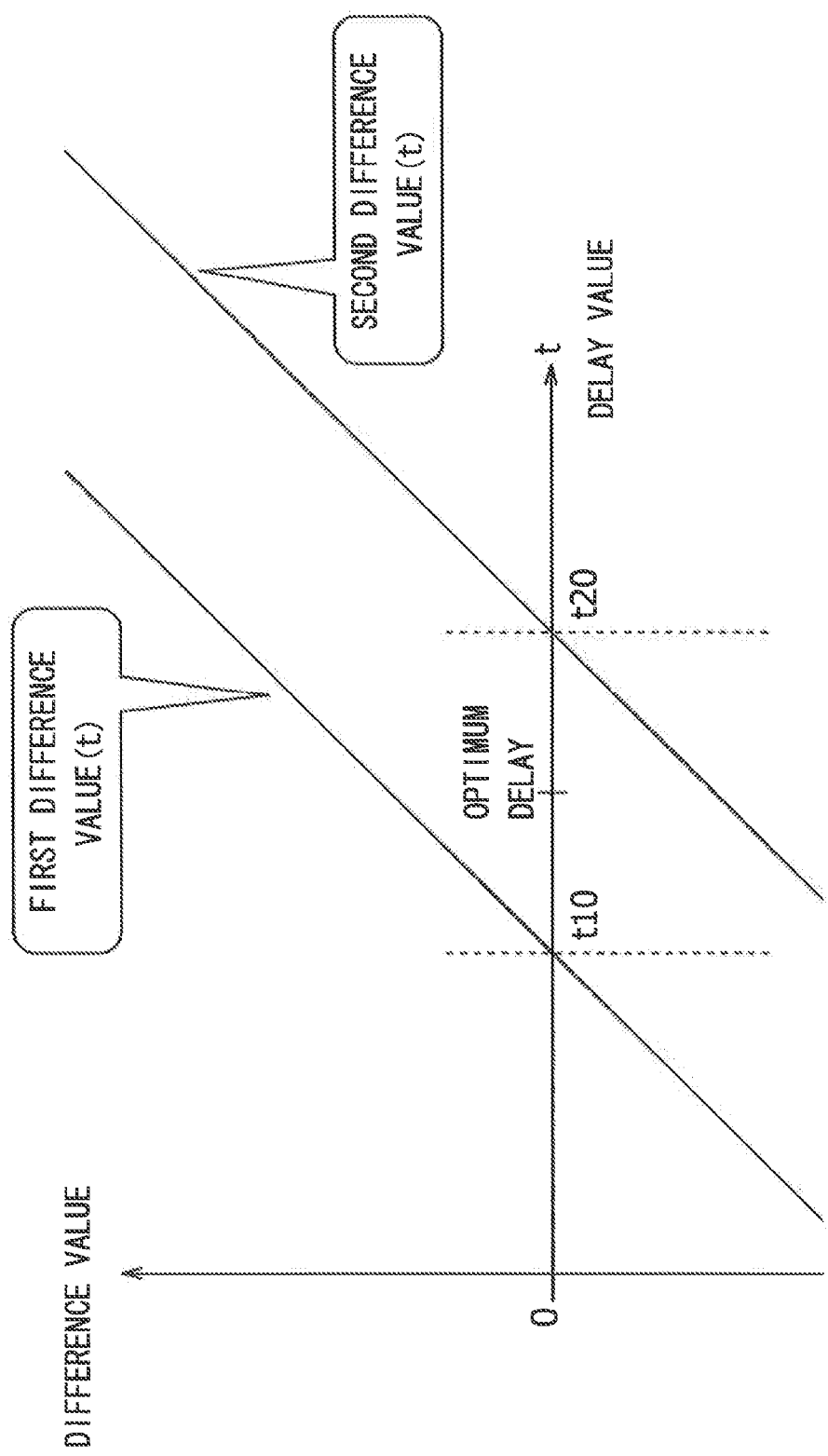
FIG. 16 is an explanatory diagram illustrating a method by which the time t given when the sign of the first difference value (t) changes is set to t10 and the time t given when a sign of a second difference value (t) changes is set to t20.

FIG. 16 is an explanatory diagram illustrating the method by which the time t given when the sign of the first difference value (t) changes is set to t10 and the time t given when the sign of the second difference value (t) changes is set to t20. A graph in FIG. 16 depicts a relationship between the delay value and the difference value, in which the axis of abscissa indicates the delay value, and the axis of ordinate indicates the difference value. An assumption herein is that the delay calculation unit 230 obtains the first difference value (t) and the second difference value (t) while increasing the time t on, e.g., the unit of "tap". Herein, the time t given when the sign of the first difference value changes (e.g., when changing to positive from negative) shall be set to t10 and the time t given when the sign of the second difference value changes shall be set to t20. At this time, the optimum delay is given by (t10+t20)/2.

Figure 17:
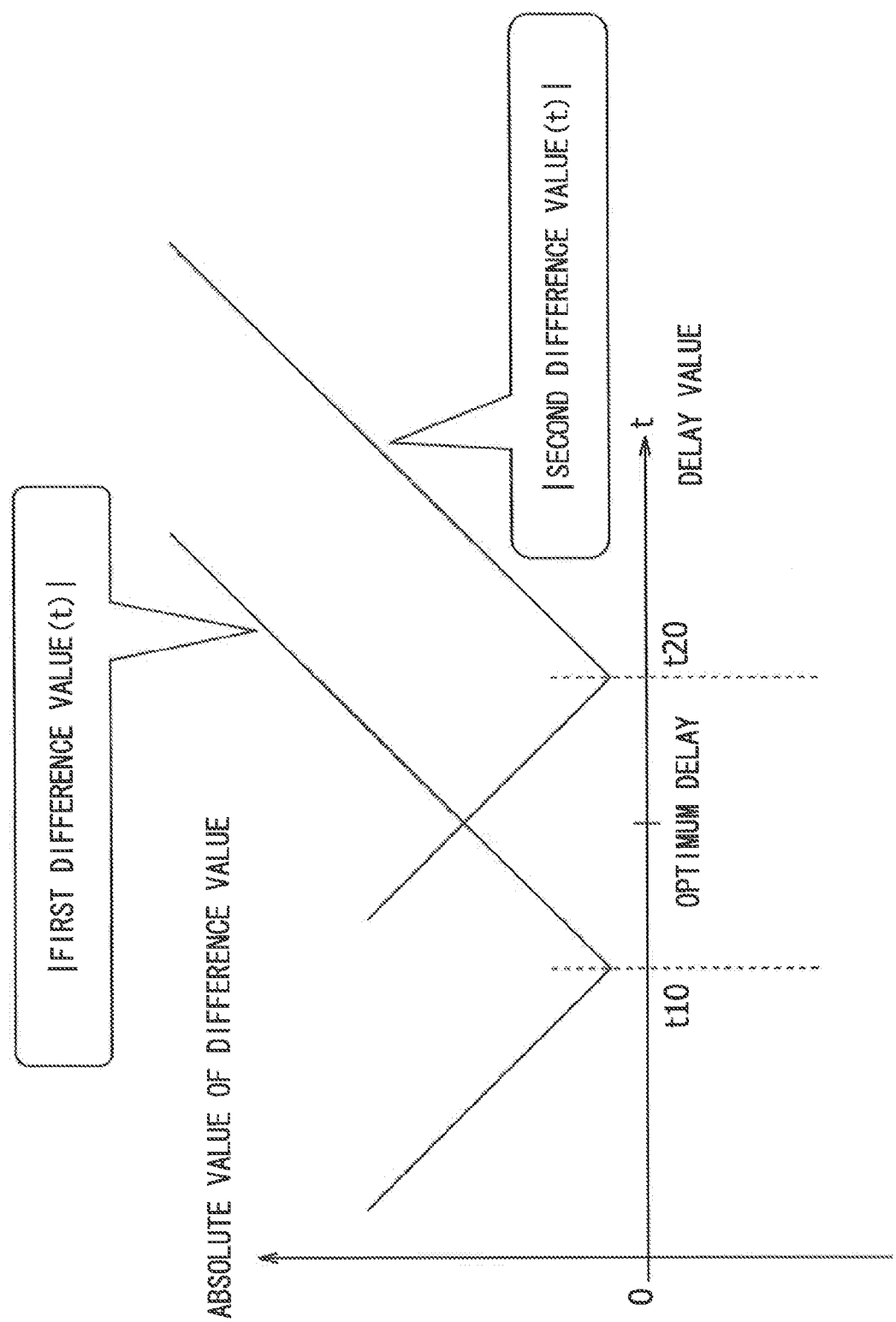
FIG. 17 is an explanatory diagram illustrating a method by which the time t given when an absolute value of the first difference value (t) is minimized is set to t10 and the time t given when the absolute value of the second difference value (t) is minimized is set to t20.

FIG. 17 is an explanatory diagram illustrating the method by which the time t given when the absolute value of the first difference value (t) is minimized is set to t10 and the time t given when the absolute value of the second difference value (t) is minimized is set to t20. A graph in FIG. 17 depicts a relationship between the delay value and the absolute value of the difference value, in which the axis of abscissa indicates the delay value, and the axis of ordinate indicates the difference value. The assumption herein is that the delay calculation unit 230 obtains absolute values of the first difference value (t) and the second difference value (t) while changing the time t on, e.g., the unit of "tap". Herein, the time t given when the absolute value of the first difference value is minimized shall be set to t10 and the time t given when the absolute value of the second difference value is minimized shall be set to t20. At this time, the optimum delay is given by (t10+t20)/2.

Operational Example 2-1

An operational example 2-1 of the delay measuring unit 220 of the signal transmission apparatus 200 will be described.

Figure 18:
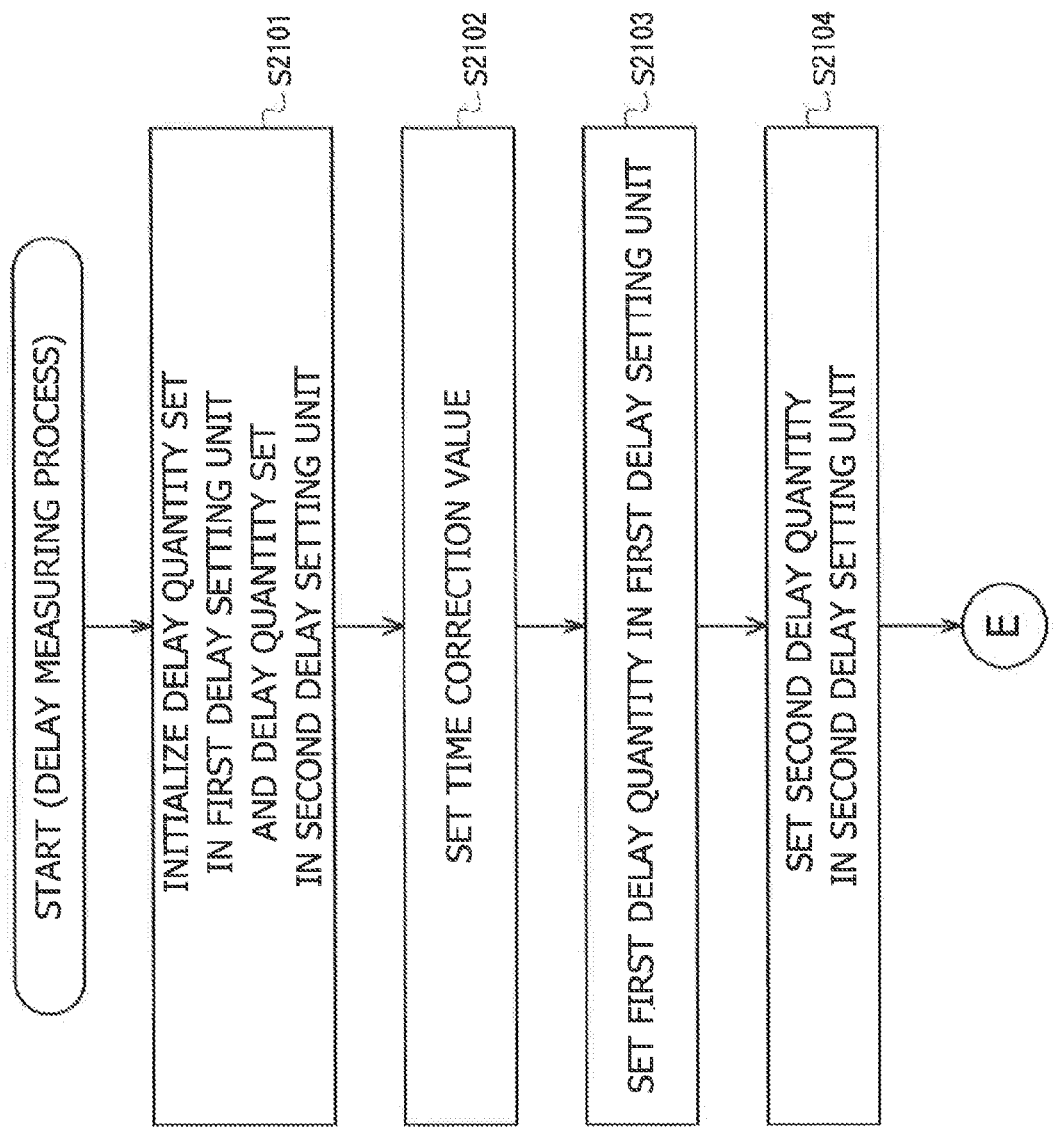
FIG. 18 is a flowchart illustrating an example (1) of an operating flow of the delay measuring process of a delay measuring unit 220 of a signal transmission apparatus 200.
Figure 19:
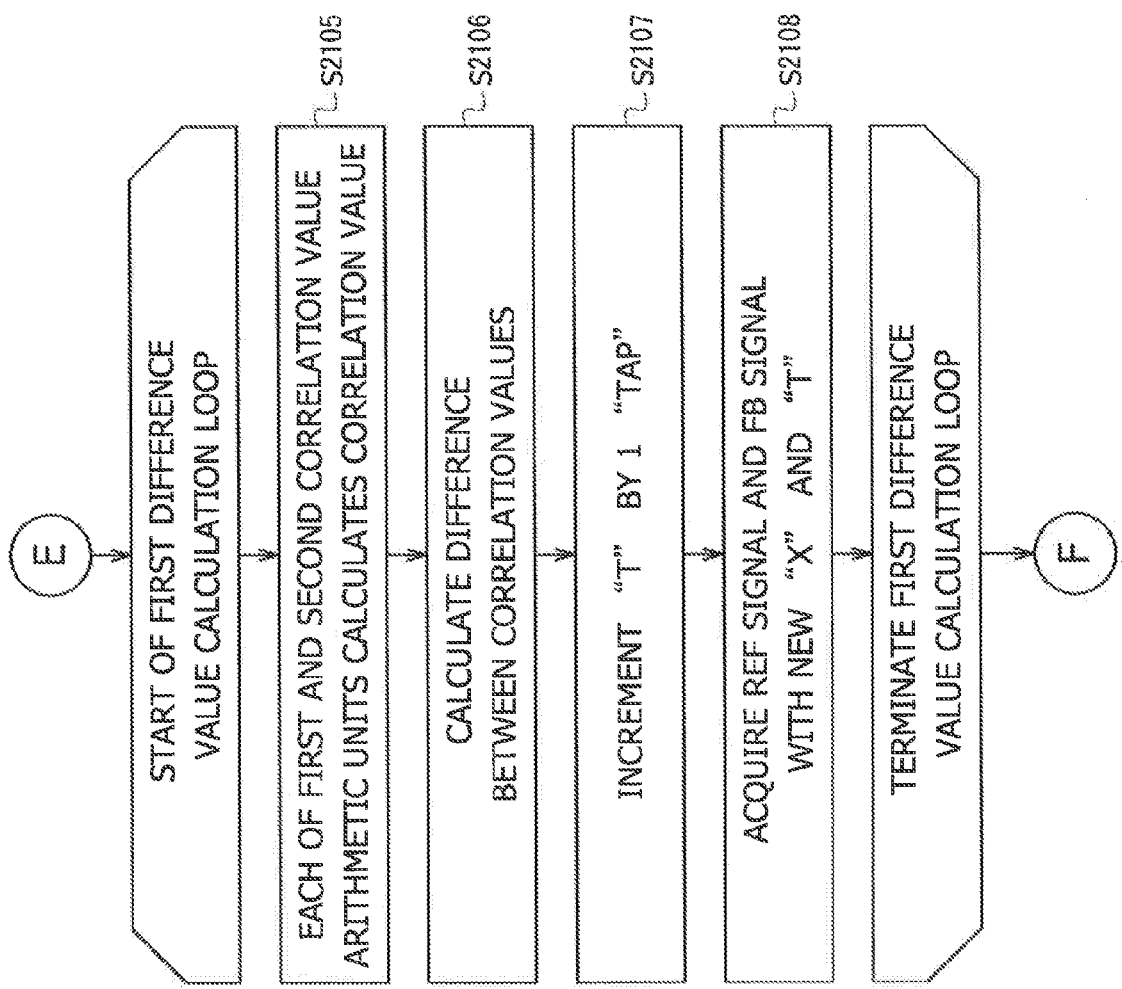
FIG. 19 is a flowchart illustrating an example (2) of the operating flow of the delay measuring process of the delay measuring unit 220 of the signal transmission apparatus 200.
Figure 20:
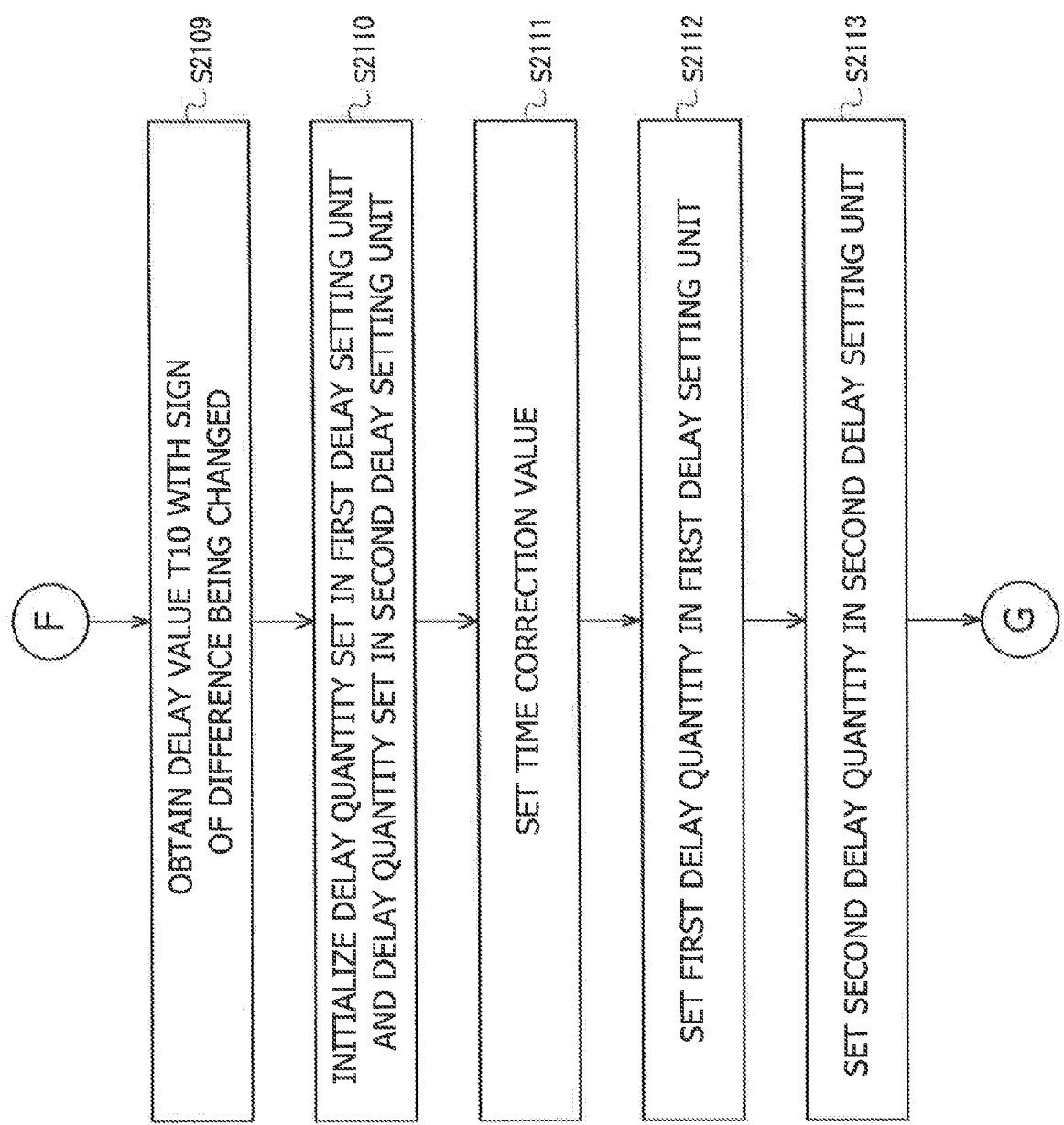
FIG. 20 is a flowchart illustrating an example (3) of the operating flow of the delay measuring process of the delay measuring unit 220 of the signal transmission apparatus 200.
Figure 21:
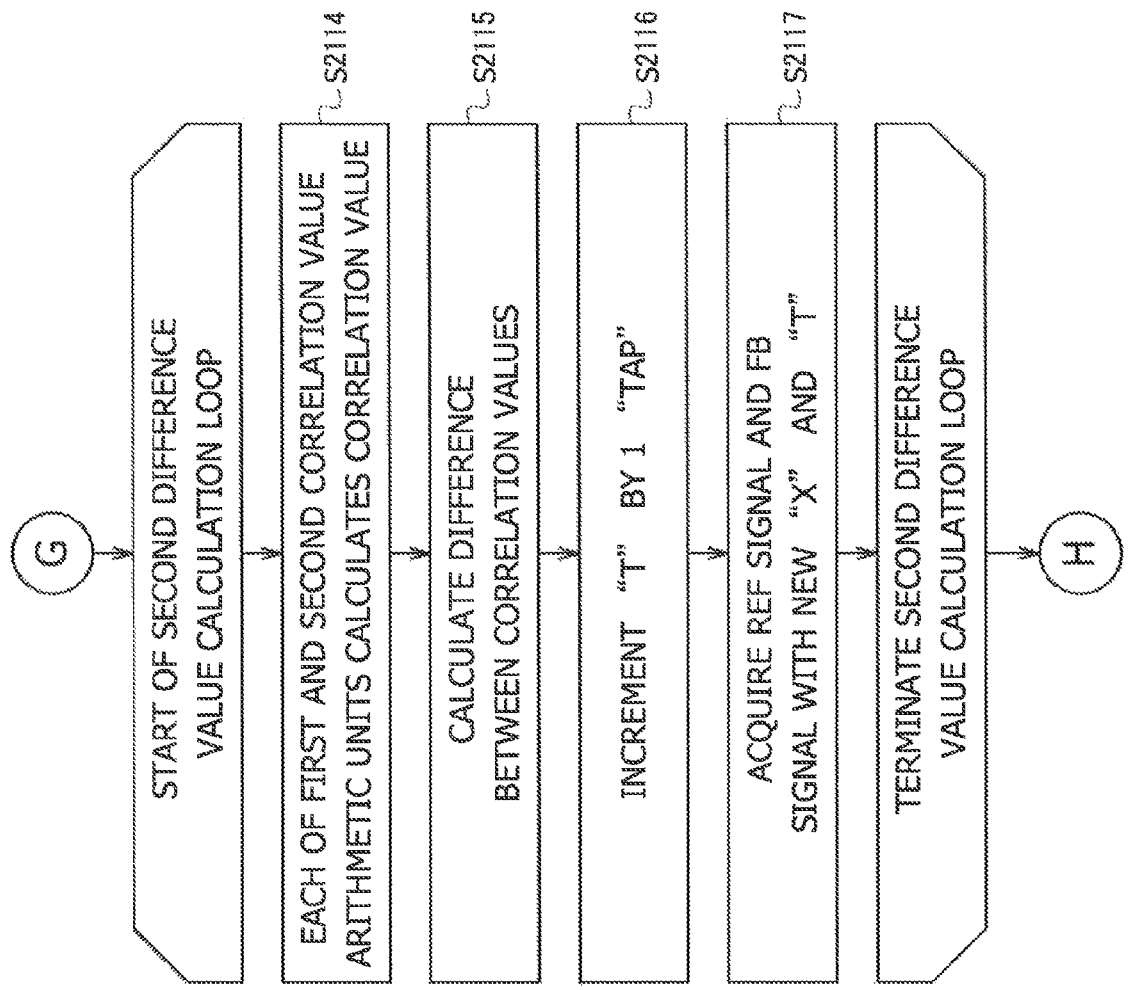
FIG. 21 is a flowchart illustrating an example (4) of the operating flow of the delay measuring process of the delay measuring unit 220 of the signal transmission apparatus 200.
Figure 22:
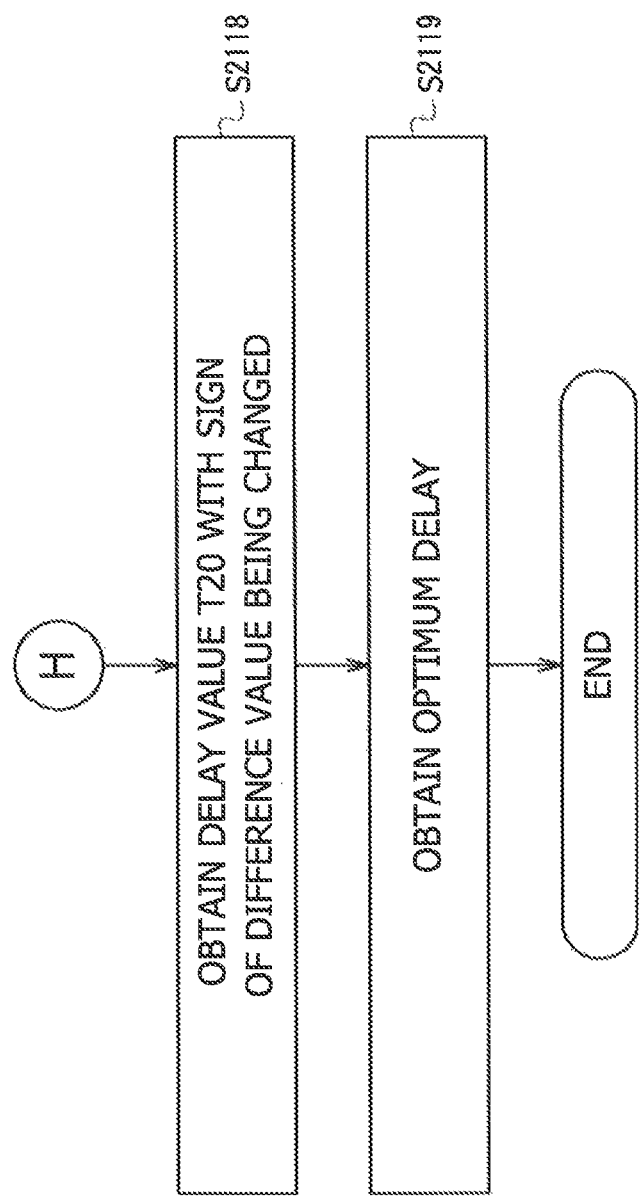
FIG. 22 is a flowchart illustrating an example (5) of the operating flow of the delay measuring process of the delay measuring unit 220 of the signal transmission apparatus 200.

FIGS. 18, 19, 20, 21 and 22 are flowcharts each illustrating an example of an operating flow of the delay measuring process of the delay measuring unit 220 of the signal transmission apparatus 200. A symbol [E] in FIG. 18 is continued to [E] in FIG. 19. A symbol [F] in FIG. 19 is continued to [F] in FIG. 20. A symbol [G] in FIG. 20 is continued to [G] in FIG. 21. A symbol [H] in FIG. 21 is continued to [H] in FIG. 22.

The operating flow for obtaining the first difference value is looped from step S2101 down to step S2108. An operation starting from step S2101 and ending with step S2108 is the same as the operation for obtaining the difference value in step S1101 through step S1108 of the operational example 1-1.

When a first difference value calculation loop terminates, the delay calculation unit 230 increments the time t on the tap-by-tap basis from "t=ts" with respect to the difference value (t) calculated in the first difference value calculation loop and sets, to the delay value t10, the time t given when the sign of the difference value (t) changes (S2109).

The operating flow for obtaining the second difference value is looped from step S2110 down to step S2117.

The delay calculation unit 230 of the delay measuring unit 220 initializes the first delay quantity set in the first delay setting unit 222 and the second delay quantity set in the second delay setting unit 224 (S2110). The delay measuring unit 220 sets the time correction value ts (S2111). The time correction value ts is set to a value given by subtracting, e.g., 2 clk from the optimum delay that has been calculated before. Further, the time correction value ts may also be a quantity given beforehand based on the configuration etc. of the signal transmission apparatus 200.

The delay calculation unit 230 notifies the first delay setting unit 222 of the first delay quantity (S2112). The delay calculation unit 230 sets the first delay quantity to, e.g., 3 clk. The first delay setting unit 222 delays the Ref signal with the first delay quantity indicated from the delay calculation unit 230, and outputs the delayed Ref signal to the first correlation value arithmetic unit 226 and the second correlation value arithmetic unit 228. Herein, the timing of the Ref signal output from the first delay setting unit 222 shall be set to the timing x. The timing x is the timing given by subtracting, from the present timing, the first delay quantity indicated from the delay calculation unit 230. The delay calculation unit 230 may also notify the first delay setting unit 222 of the timing x. Let Ref(x) be the Ref signal that is output from the first delay setting unit 222.

The delay calculation unit 230 notifies the second delay setting unit 224 of the second delay quantity (S2113). The delay calculation unit 230 sets the second delay quantity to a value given by subtracting the first delay quantity from the time correction value ts. The second delay setting unit 224 delays the FB signal with the second delay quantity indicated from the delay calculation unit 230, and outputs the delayed FB signal to the first correlation value arithmetic unit 226 and the second correlation value arithmetic unit 228. The timing of the FB signal output from the first delay setting unit 222 becomes the timing x+ts. The delay calculation unit 230 may also notify the second delay setting unit 224 of the timing x+ts. Let FB(x+t) be the FB signal output from the second delay setting unit 224. Herein, the time t is set to the time ts.

A second difference value calculation loop starts from here.

The first correlation value arithmetic unit 226 obtains the correlation value between the Ref signal Ref(x) output from the first delay setting unit 222 and the FB signal FB(x+t) output from the second delay setting unit 224. The first correlation value arithmetic unit 226 outputs the thus-obtained correlation value to the delay calculation unit 230. The second correlation value arithmetic unit 228 obtains the correlation value between a Ref signal Ref(x+a) output from the first delay setting unit 222 and the FB signal FB(x+t) output from the second delay setting unit 224 (S2114). The second correlation value arithmetic unit 228 obtains the correlation value between the Ref signal delayed by the time a from the Ref signal output from the first delay setting unit 222 and the FB signal. The time a takes the fixed value. The time a is, e.g., 1 clk (clock) of the sampling speed. The second correlation value arithmetic unit 228 outputs the thus-obtained correlation value to the delay calculation unit 230.

The delay calculation unit 230 calculates a difference between the correlation value obtained by the first correlation value arithmetic unit 226 and the correlation value obtained by the second correlation value arithmetic unit 228, and sets this calculated difference as a second difference value (t) with respect to the delay value t (S2115).

The delay calculation unit 230 sets what a 1-tap value is added to the time t as a new time t (S2116). The delay calculation unit 230 notifies the first delay setting unit 222 of the first delay quantity. The first delay quantity may be the same as the first delay quantity given in step S2103. The delay calculation unit 230 notifies the second delay setting unit 224 of the second delay quantity. The second delay quantity shall be a value given by subtracting the first delay quantity from the time L. Further, the timing x and the timing "x+t" may also be used as substitutes for the first delay quantity and the second delay quantity.

The first delay setting unit 222 and the second delay setting unit 224 output the Ref signal and the FB signal respectively on the basis of the new time t and the new timing x. The first correlation value arithmetic unit 226 and the second correlation value arithmetic unit 228 acquire the Ref signal and the FB signal on the basis of the new time t and the new timing x (S2117).

The second difference value calculation loop terminates when the time t becomes, e.g., "ts+4 clk".

When the second difference value calculation loop terminates, the delay calculation unit 230 increments the time t on the tap-by-tap basis from "t=ts" with respect to the second difference value (t) calculated in the difference value calculation loop and sets, to the delay value t20, the time t given when the sign of the second difference value (t) changes (S2118).

The delay calculation unit 230 calculates "(t10+t20)/2" as the optimum delay (S2119). The delay calculation unit 230 notifies the delay adjusting unit 212 of the optimum delay.

Thus, the delay measuring unit 220 calculates the optimum delay from the two types of difference values and notifies the delay adjusting unit 212 of the optimum delay.

Operational Example 2-2

An operational example 2-2 of the delay measuring unit 220 of the signal transmission apparatus 200 will be described. Explanations of points common to the operational example 2-1 are omitted.

Figure 23:
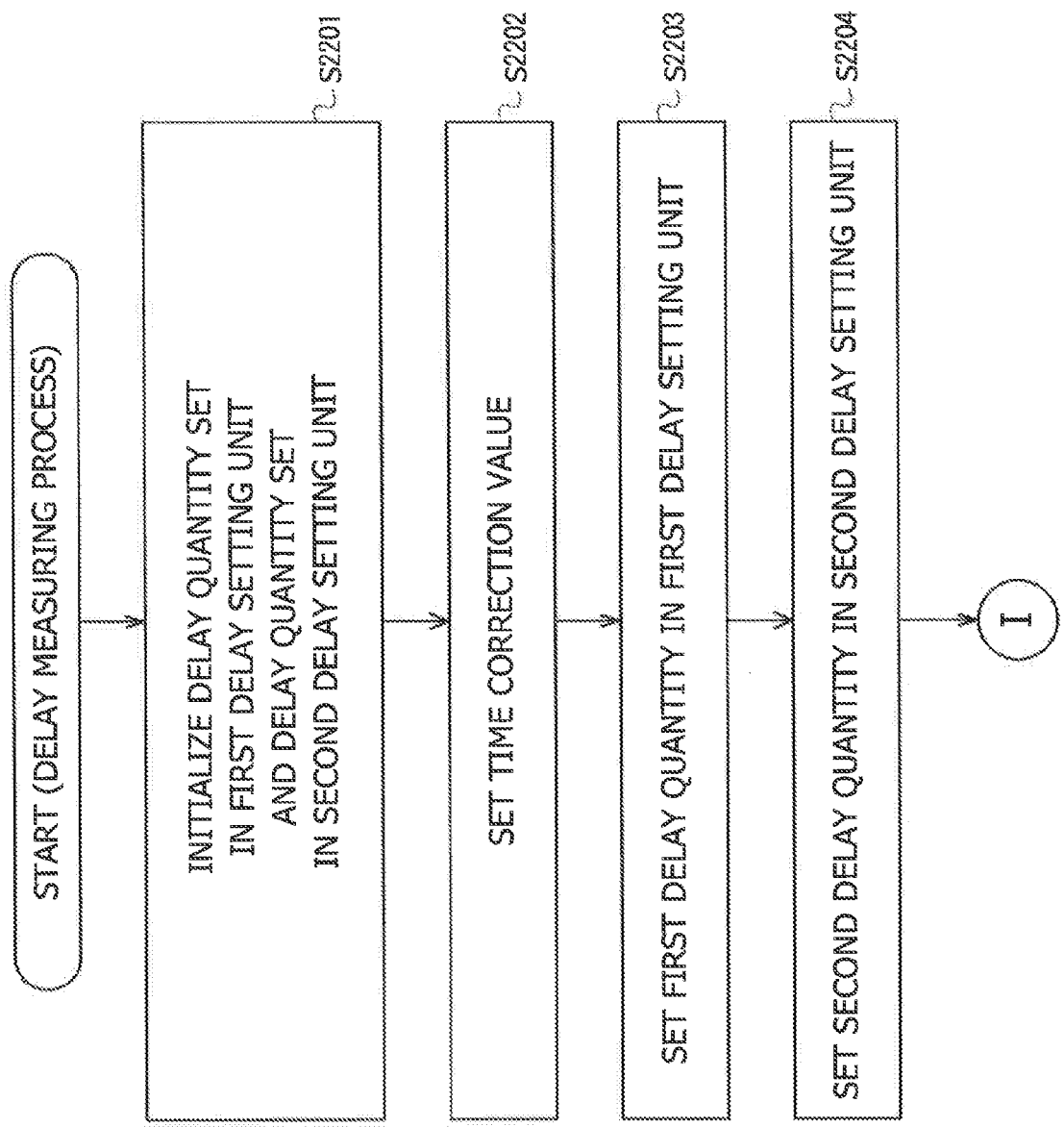
FIG. 23 is a flowchart illustrating an example (1) of an operating flow of another delay measuring process of the delay measuring unit 220 of the signal transmission apparatus 200.
Figure 24:
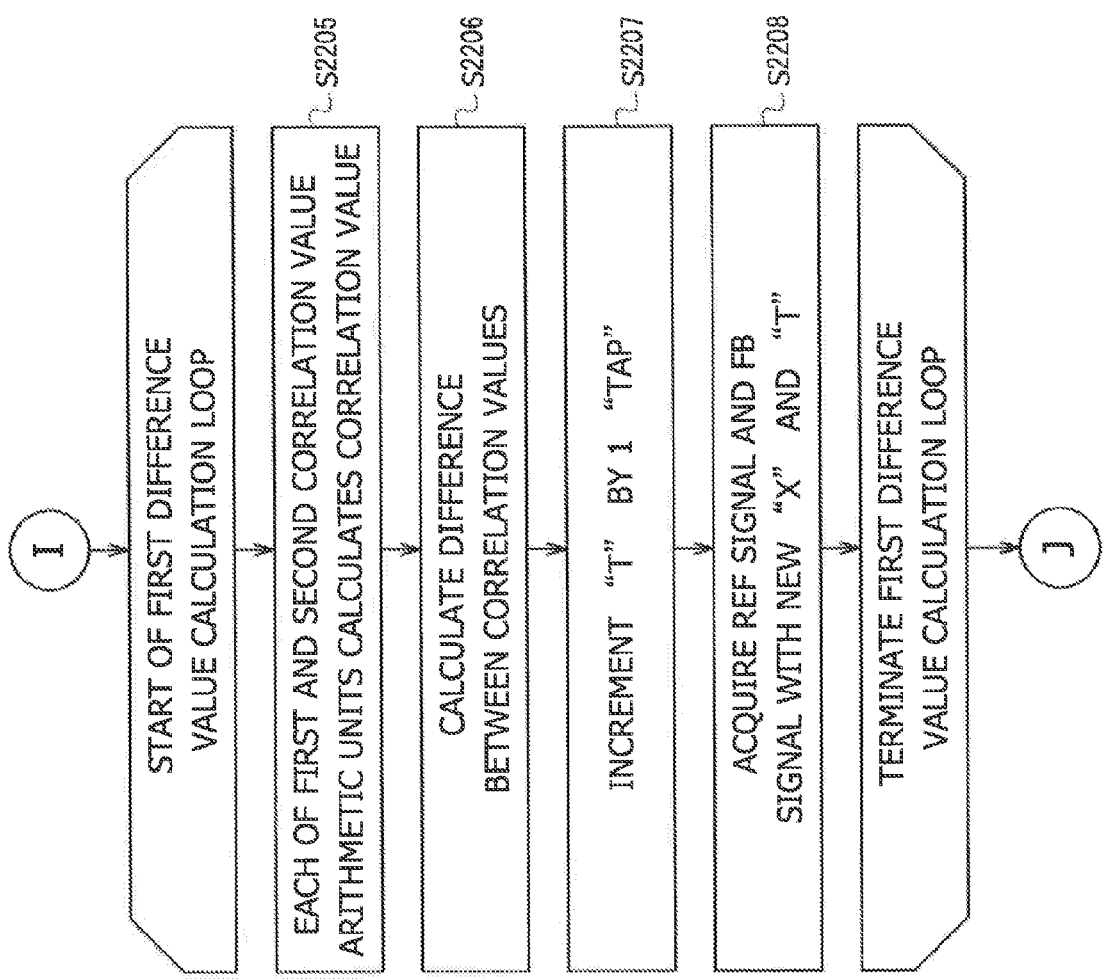
FIG. 24 is a flowchart illustrating an example (2) of the operating flow of the delay measuring process of the delay measuring unit 220 of the signal transmission apparatus 200.
Figure 25:
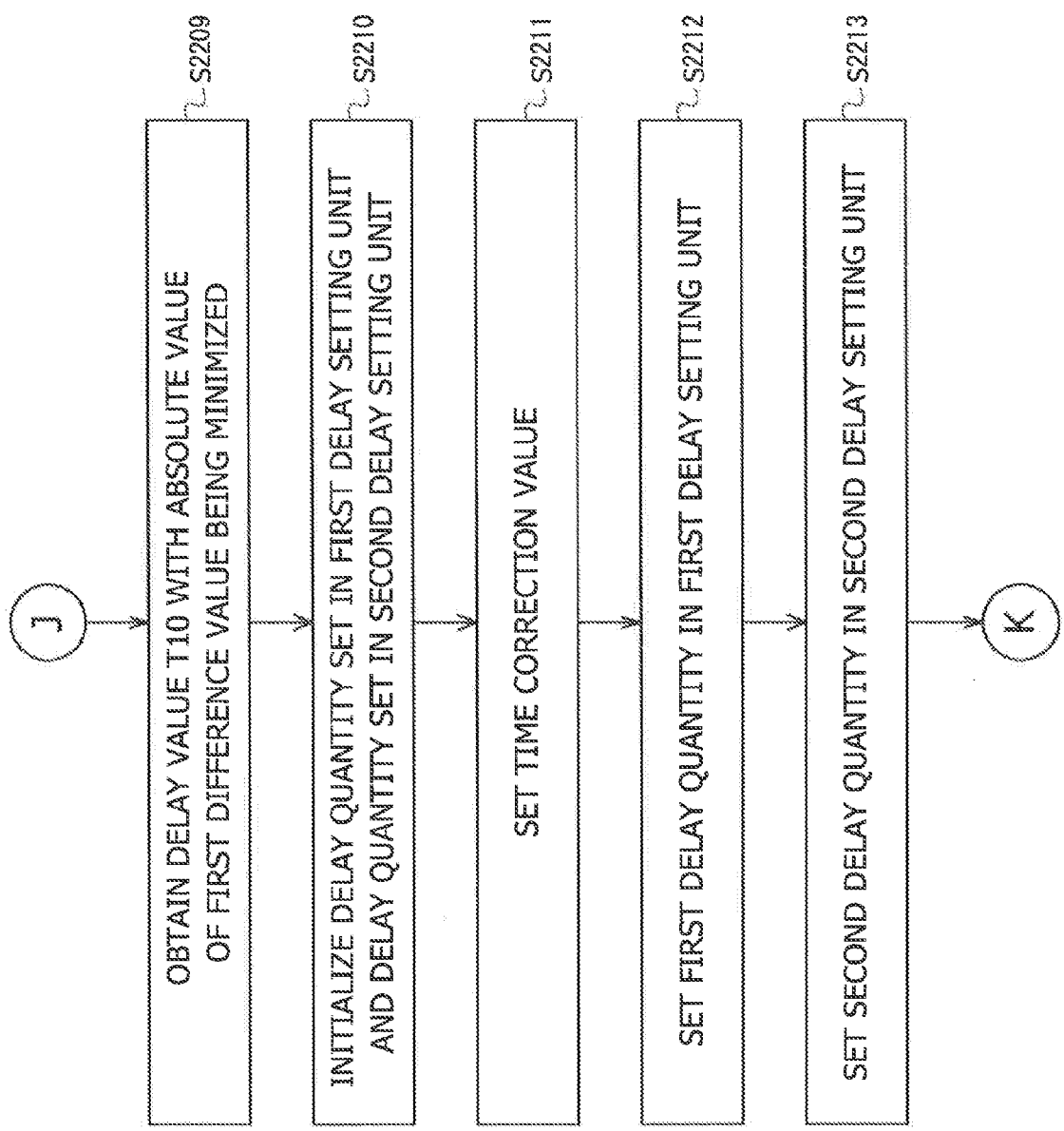
FIG. 25 is a flowchart illustrating an example (3) of the operating flow of the delay measuring process of the delay measuring unit 220 of the signal transmission apparatus 200.
Figure 26:
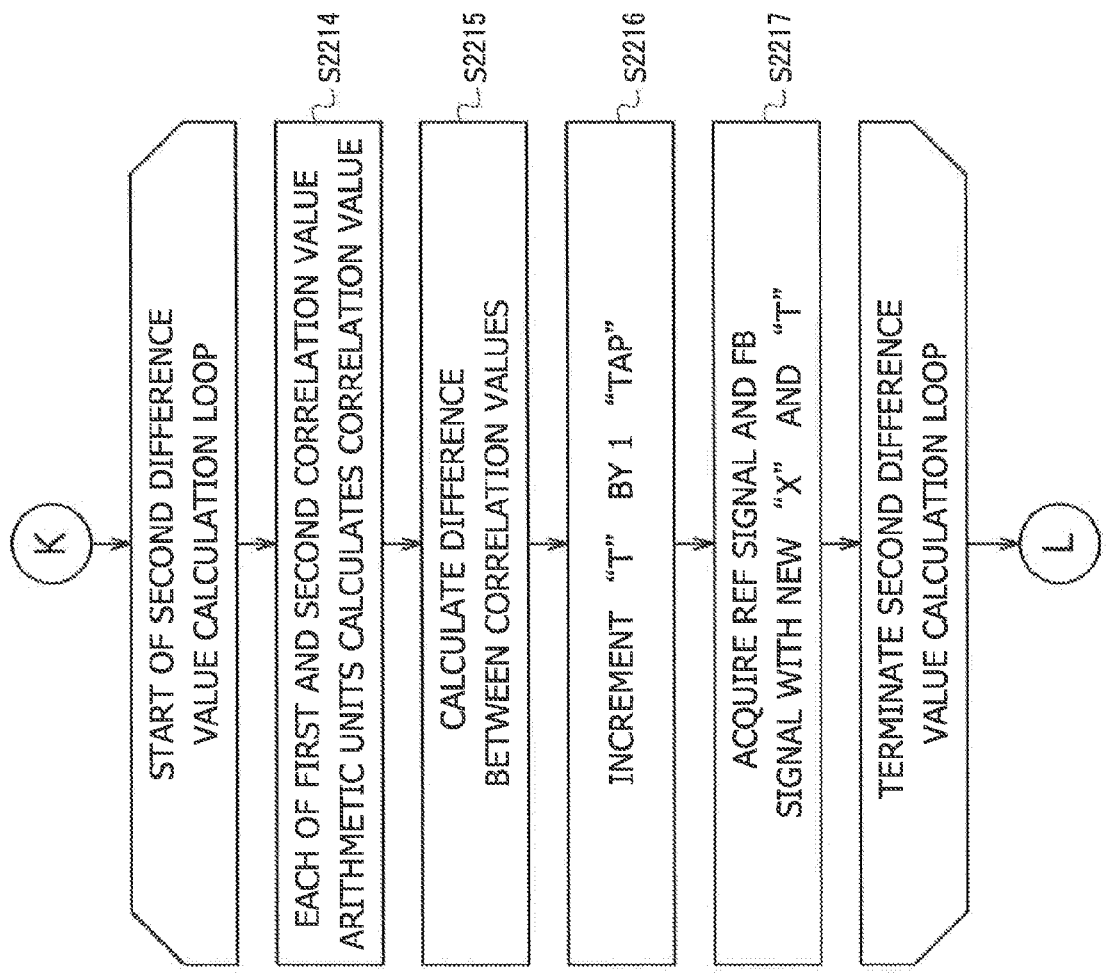
FIG. 26 is a flowchart illustrating an example (4) of the operating flow of the delay measuring process of the delay measuring unit 220 of the signal transmission apparatus 200.
Figure 27:
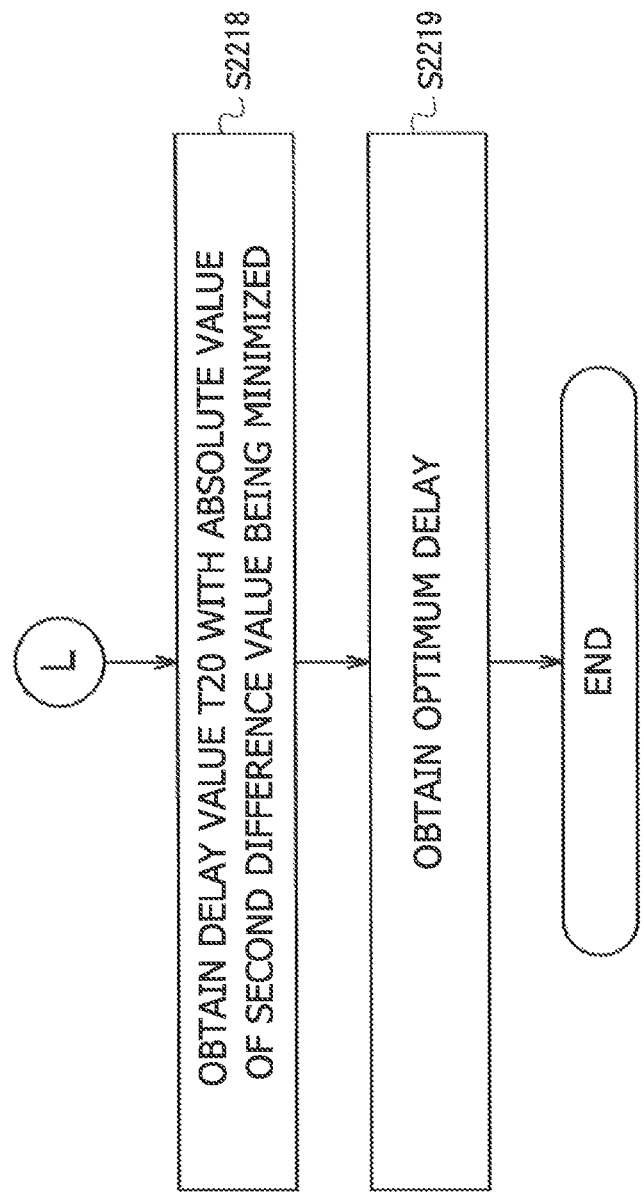
FIG. 27 is a flowchart illustrating an example (5) of the operating flow of the delay measuring process of the delay measuring unit 220 of the signal transmission apparatus 200.

FIGS. 23, 24, 25, 26 and 27 are flowcharts each illustrating an example of an operating flow of the delay measuring process of the delay measuring unit 220 of the signal transmission apparatus 200. A symbol [I] in FIG. 23 is continued to [I] in FIG. 24. A symbol [J] in FIG. 24 is continued to [J] in FIG. 25. A symbol [K] in FIG. 25 is continued to [K] in FIG. 26. A symbol [L] in FIG. 26 is continued to [L] in FIG. 27.

Steps S2201 through S2208 are the same as steps S2101 through S2108 of the operational example 2-1.

When the first difference value calculation loop terminates, the delay calculation unit 230 takes an absolute value with respect to the first difference value (t) calculated in the first difference value calculation loop. The delay calculation unit 230 sets, to the delay value t10, the time t given when the absolute value of the first difference value (t) is minimized (S2209).

Steps S2210 through S2217 are the same as steps S2110 through S2117 of the operational example 2-1.

When the second difference value calculation loop terminates, the delay calculation unit 230 takes an absolute value with respect to the second difference value (t) calculated in the second difference value calculation loop. The delay calculation unit 230 sets, to the delay value t20, the time t given when the absolute value of the second difference value (t) is minimized (S2218).

The delay calculation unit 230 calculates "(t10+t20)/2" as the optimum delay (S2219). The delay calculation unit 230 notifies the delay adjusting unit 212 of the optimum delay.

Thus, the delay measuring unit 220 calculates the optimum delay from the two types of difference values and notifies the delay adjusting unit 212 of the optimum delay.

Operation and Effect of Second Embodiment

The signal transmission apparatus 200 obtains the two correlation values from the input signal (Ref signal) and the feedback signal (FB signal), and obtains the first difference value defined as the difference between the correlation values. Further, the signal transmission apparatus 200 obtains the two correlation values from another input signal and the feedback signal, and obtains the second difference value defined as the difference between these correlation values. The signal transmission apparatus 200 obtains the delay quantity of the feedback signal with respect to the input signal from the delay value with the absolute value of the first difference value being minimized and from the delay value with the absolute value of the second difference value being minimized. The signal transmission apparatus 200 obtains the two correlation values from the input signal and the feedback signal that are acquired at the identical timing, thereby making it possible to calculate the delay quantity of the feedback signal with respect to the input signal with the higher accuracy.

In the configuration described above, the delay measuring unit 220 may also obtain the optimum delay by calculating the correlation value in a way that fixes the FB signal but changes the Ref signal, with the timing x being set to the timing "x−t".

Further, in the configuration described above, the delay measuring unit 220 may obtain the optimum delay by calculating the correlation values in a way that changes the FB signal and the Ref signal, with the timing x being set to the timing "x−αt". The parameter α is, e.g., equal to or larger than 0 but equal to or smaller than 1.

The respective embodiments discussed above can be carried out by combining these embodiments to the greater possible degree.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A delay quantity estimation apparatus comprising:
    a first correlation value arithmetic unit to calculate a first correlation value as a correlation value between a first input signal and a feedback signal delayed with a first delay value;
    a second correlation value arithmetic unit to calculate a second correlation value as a correlation value between the first input signal and a feedback signal delayed with a second delay value; and
    a delay quantity estimation unit to estimate a delay quantity of the feedback signal on the basis of a first difference value as a difference between the first correlation value and the second correlation value,
    wherein the second delay value is equal to a value given by adding a certain value to the first delay value,
    the first correlation value arithmetic unit calculates a third correlation value as a correlation value between a second input signal and the feedback signal delayed with a third delay value with respect to the second input signal,
    the second correlation value arithmetic unit calculates a fourth correlation value as a correlation value between the second input signal delayed with the certain value and the feedback signal delayed with the third delay value, and
    the delay quantity estimation unit estimates a delay quantity of the feedback signal on the basis of the first difference value and a second difference value as a difference between the third correlation value and the fourth correlation value.

2. The delay quantity estimation apparatus according to claim 1, wherein the delay quantity estimation unit estimates the delay quantity on the basis of the first delay value given when the absolute value of the first difference value is minimized and the third delay value given when the absolute value of the second difference value is minimized.

3. A delay quantity estimation method comprising:
    calculating a first correlation value as a correlation value between a first input signal and a feedback signal delayed with a first delay value;
    calculating a second correlation value as a correlation value between the first input signal and a feedback signal delayed with a second delay value; and
    estimating a delay quantity of the feedback signal on the basis of a first difference value as a difference between the first correlation value and the second correlation value,
    wherein the second delay value is equal to a value given by adding a certain value to the first delay value,
    the method further comprising:
    calculating a third correlation value as a correlation value between a second input signal and the feedback signal delayed with a third delay value with respect to the second input signal;
    calculating a fourth correlation value as a correlation value between the second input signal delayed with the certain value and the feedback signal delayed with the third delay value; and
    estimating a delay quantity of the feedback signal on the basis of the first difference value and a second difference value as a difference between the third correlation value and the fourth correlation value.

4. The delay quantity estimation method according to claim 3, further comprising estimating the delay quantity on the basis of the first delay value given when the absolute value of the first difference value is minimized and the third delay value given when the absolute value of the second difference value is minimized.

* * * * *